(12) United States Patent
Yoneda et al.

(10) Patent No.: US 7,568,274 B2
(45) Date of Patent: Aug. 4, 2009

(54) METHOD FOR MANUFACTURING MAGNETOSTRICTIVE TORQUE SENSOR DEVICE, AND ELECTRIC POWER STEERING APPARATUS

(75) Inventors: Atsuhiko Yoneda, Wako (JP); Yasuo Shimizu, Wako (JP); Hisao Asaumi, Wako (JP); Yutaka Arimura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/896,222

(22) Filed: Aug. 30, 2007

(65) Prior Publication Data

US 2008/0053250 A1 Mar. 6, 2008

(30) Foreign Application Priority Data

Aug. 30, 2006 (JP) ............... 2006-234575

(51) Int. Cl.
*B23P 25/00* (2006.01)
(52) U.S. Cl. ........................ 29/458; 29/527.2
(58) Field of Classification Search ............. 29/606, 29/602.1, 831, 854, 596, 458, 527.2; 73/862.333, 73/862.335
See application file for complete search history.

(56) References Cited

U.S. PATENT DOCUMENTS 6,574,853 B2 * 6/2003 Shinoura .................. 29/602.1
6,944,937 B2 * 9/2005 Hsiao et al. ............... 29/603.09
7,310,870 B2 * 12/2007 Shimizu et al. ............ 29/594
7,386,930 B2 * 6/2008 Shimizu et al. ............ 29/594

FOREIGN PATENT DOCUMENTS

| EP | 1 477 788 A2 | 11/2004 |
|---|---|---|
| EP | 1 725 752 A1 | 2/2007 |
| EP | 1 752 750 A1 | 2/2007 |
| JP | 02-163625 A | 6/1990 |
| JP | 2001-050830 A | 2/2001 |
| JP | 2004-340744 A | 12/2004 |
| JP | 3730234 B2 | 10/2005 |
| WO | WO 00/57150 A1 | 9/2000 |

* cited by examiner

*Primary Examiner*—Jewel Thompson
(74) *Attorney, Agent, or Firm*—Arent Fox LLP

(57) ABSTRACT

A method for manufacturing a magnetostrictive torque sensor device includes the steps of: providing a steering shaft or another such rotating shaft with two magnetostrictive parts endowed with magnetic anisotropy; disposing detection coils around the magnetostrictive parts to detect changes in magnetostrictive characteristics of the magnetostrictive parts; providing a detection circuit for bringing out detection signals from signals outputted from the detection coils; and adjusting a gain of a gain adjuster included in the detection circuit.

3 Claims, 18 Drawing Sheets

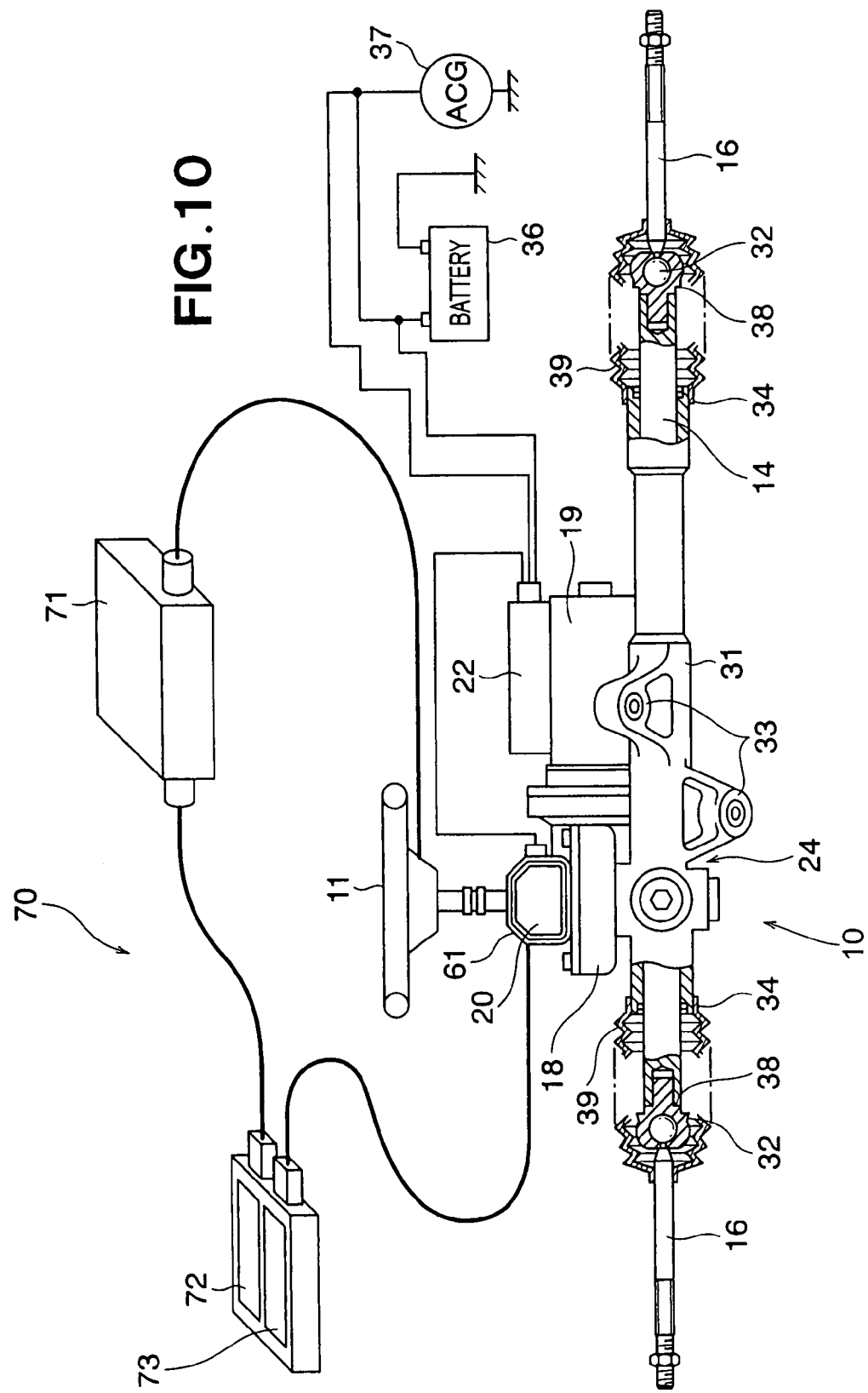

TORQUE SENSING VOLTAGE

INITIAL MEASUREMENTS

TORQUE SENSING VOLTAGE

AFTER GAIN IS SET

FIG.15(a)
FIG.15(b) FIG.15(d)
FIG.15(c)
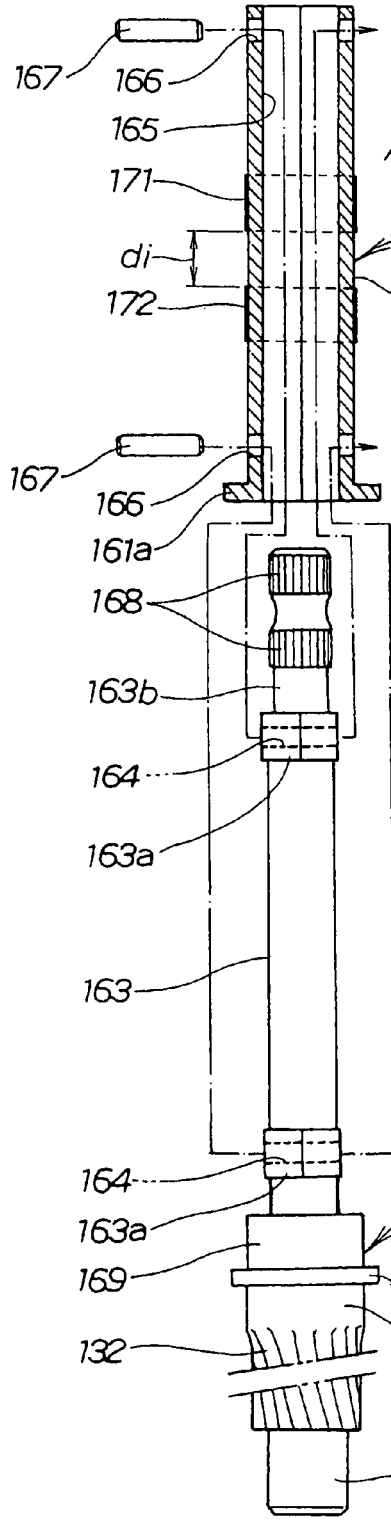
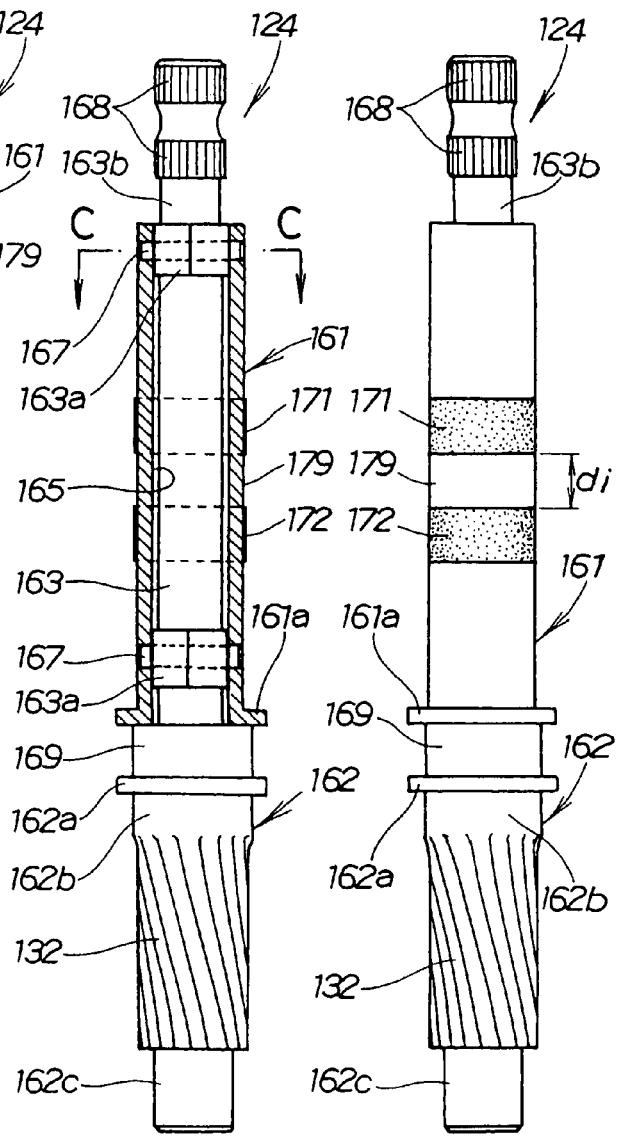
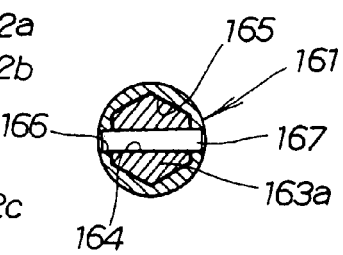

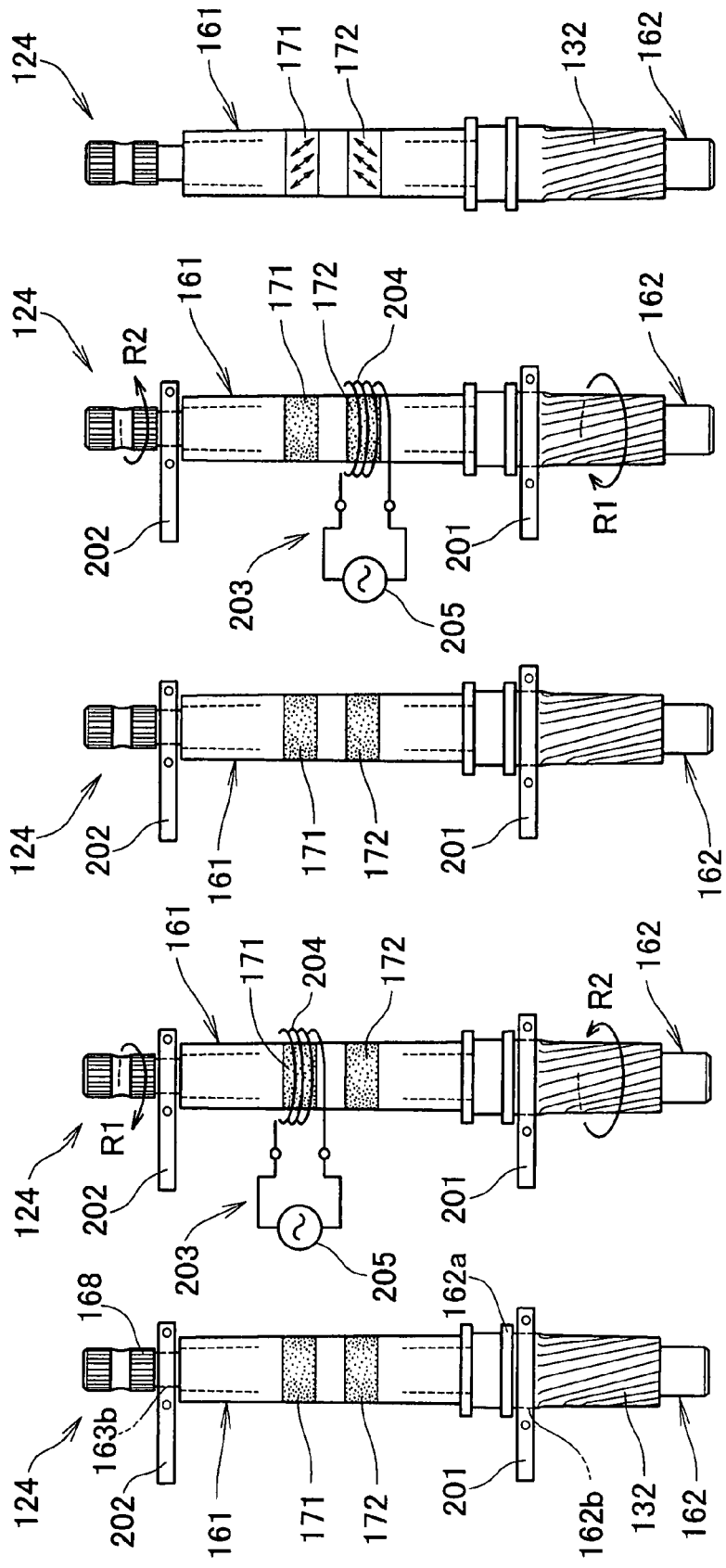

METHOD FOR MANUFACTURING MAGNETOSTRICTIVE TORQUE SENSOR DEVICE, AND ELECTRIC POWER STEERING APPARATUS

FIELD OF THE INVENTION

The present invention relates to a method for manufacturing a magnetostrictive torque sensor device, as well as to an electric power steering apparatus that includes a magnetostrictive torque sensor device made by such a manufacturing method.

BACKGROUND OF THE INVENTION

An electric power steering apparatus is a supporting apparatus that engages a motor to assist steering force when the driver operates the steering wheel while the automobile is moving. An electric power steering apparatus includes a steering torque sensor for sensing steering torque generated in a steering shaft by the handling operations of the driver. In an electric power steering apparatus, a steering torque signal outputted from the steering torque sensor and a vehicle speed signal outputted from a vehicle speed sensor are used to perform control by means of a motor drive controller and to use PWM to drive a supporting motor that outputs auxiliary steering force, thus reducing the steering force for the driver.

Known conventional examples of a steering torque sensor in an electric power steering apparatus include a torsion bar-type torque-sensing device provided between the input and output shafts of a pinion, and a magnetostrictive torque sensor device that uses magnetostrictive effects.

A known example of a sensor portion of a magnetostrictive torque sensor device is, e.g., a structure wherein magnetostrictive films of Ni—Fe plating are provided at two top and bottom locations on the surface of the steering shaft linked to the steering wheel. These two magnetostrictive films are provided with magnetic anisotropy in opposite directions and are formed over specific widths in the axial direction. When steering torque is applied to the steering shaft, the inverse magnetostrictive characteristics generated based on the magnetic anisotropy in these two magnetostrictive films are brought out via an exciting coil and a sensing coil disposed around the peripheries of the magnetostrictive films, and the steering torque is sensed.

With reference to FIG. 17, the essential configuration of the sensor portion of a conventional magnetostrictive torque sensor device will be described. The sensor portion will hereinafter be referred to as "magnetostrictive torque sensor." The magnetostrictive torque sensor 300 includes one magnetostrictive film 302 formed around the periphery of a steering shaft 301, another magnetostrictive film 303 formed at a space from the magnetostrictive film 302, an exciting coil 304 disposed in proximity to the magnetostrictive films 302, 303 and separated by an extremely small gap, and detecting coils 306, 307 provided in a corresponding manner to the magnetostrictive films 302, 303, respectively. An exciting voltage supply source 305 is connected to the exciting coil 304.

In this magnetostrictive torque sensor 300, stress is created in the magnetostrictive films 302, 303 when steering torque acts around the axial center of the steering shaft 301. Magnetostrictive effects are generated in the magnetostrictive films 302, 303 in accordance with this stress. In view of this, AC exciting voltage is supplied from the exciting voltage supply source 305 to the exciting coil 304, and the change in magnetic field caused by the magnetostrictive effects of the magnetostrictive films 302, 303 is detected by the detecting coils 306, 307 as a change in impedance. The steering torque applied to the steering shaft 301 is sensed based on this change in impedance. Instead of detecting a change in impedance, another possibility is to detect a change in induced voltage. The following is a description of a case in which a change in impedance is detected.

FIG. 18 is a graph showing magnetostrictive characteristics. The horizontal axis represents steering torque applied to the steering shaft 301, and the vertical axis represents the change in impedance generated in the detecting coils 306, 307 when AC exciting voltage is applied to the exciting coil 304. The curve C110 represents the change in impedance brought out by the detecting coil 306, and the curve C11 represents the change in impedance brought out by the detecting coil 307.

In the detecting coil 306, the impedance increases as the steering torque goes from negative to positive, the impedance peaks when the steering torque reaches the positive value T1, and the impedance decreases when the steering torque is greater than T1. Conversely, in the detecting coil 307, the impedance peaks when the steering torque reaches the negative value −T1, and the impedance decreases when the absolute value of the steering torque increases.

As is clear in FIG. 18, the steering torque-impedance characteristics obtained in the detecting coil 306 and the steering torque-impedance characteristics obtained in the detecting coil 307 form substantially convex curves. The steering torque-impedance characteristics (curve C110) obtained in the detecting coil 306 and the steering torque-impedance characteristics (curve C111) obtained in the detecting coil 307 are also symmetrical about the vertical axis that passes through the point of intersection between the characteristic curves. This is because the two top and bottom locations of the magnetostrictive films are magnetically anisotropic in opposite directions.

The straight line L10 represents values obtained by subtracting the characteristic curve C111 detected by the detecting coil 307 from the characteristic curve C110 detected by the detecting coil 306. The value of the straight line L10 is 0 when the steering torque is 0. The magnetostrictive torque sensor 300 outputs a sensory signal corresponding to the direction and strength of the input torque by using the area assumed to have a substantially constant slope in the vicinity of the torque neutral point. The characteristics of the straight line L10 can be used to sense the steering torque from the values of the detecting coils 306, 307.

FIG. 19 shows a flowchart of a conventional method for manufacturing a magnetostrictive torque sensor. This conventional method for manufacturing a magnetostrictive torque sensor includes a step for processing a pinion at the bottom end of the steering shaft (step S101), a step for hardening the pinion (step S102), a step for tempering the pinion (step S103), a step for providing the magnetostrictive films (S104), a step for providing twisting torque (step S105), a step for heat-treating the magnetostrictive films (step S106), a step for cooling the magnetostrictive films (step S107), a step for canceling the twisting torque (step S108), and a step for performing another heat treatment (step S109). These steps are disclosed in, e.g., Japanese Patent No. 3730234. In cases in which two magnetostrictive films are provided as shown in FIG. 17, the films are provided with magnetic anisotropy in steps S105 through S108.

The method for providing magnetic anisotropy to the two magnetostrictive films 302, 303 is a method wherein the magnetostrictive films 302, 303 are heated by high-frequency heating while torque is applied to the steering shaft 301, causing the magnetostrictive films 302, 303 to creep, then torque remains applied while the steering shaft 301 and the magnetostrictive films 302, 303 are cooled to room temperature, after which the torque is canceled. The impedance value characteristics in relation to input steering torque in the detecting coil 306 form a substantially convex curve having a maximum value P1 while steering torque is positive, as indicated by the curve C110 shown in FIG. 18. The detecting coil 307 produces a substantially convex curve having a maximum value P2 while steering torque is negative, as indicated by the curve C111.

The values of steering torque that result in the maximum values of the curves C110 and C111 vary depending on the strength of the torque applied when anisotropy is provided. As the applied torque increases, so does the difference between the steering torques that result in the maximum values of the two curves C110 and C111. For example, when the applied torque is greater than the applied torque for obtaining the characteristic curves C110 and C111, the characteristic curves are the curve C210 and the curve C211. At this time, the impedance value detected by the detecting coil 306 increases as the steering torque increases, the impedance reaches a maximum P12 when the steering torque reaches a positive value T2, and the impedance decreases when the steering torque is greater than T2. The impedance value detected by the detecting coil 307 reaches a maximum P22 when the steering torque reaches a negative value −T2, and the impedance decreases when the absolute value of the steering torque further increases. The straight line L20 then represents the values obtained by subtracting the characteristic curve C211 detected by the detecting coil 307 from the characteristic curve C210 detected by the detecting coil 306, and the slope of this straight line is less than that of the straight line L10. The reason for this is that the impedance characteristics have a smaller slope at the base and less linearity. The maximum values P12 and P22 have a smaller slope and less linearity than the maximum values P1 and P2 at the neutral position, as shown in FIG. 18. Therefore, when the torque applied in the presence of anisotropy is increased, the slope of impedance outputted in relation to torque inputted to the steering shaft is smaller than when less torque is applied. Thus, the gain expressed by the ratio between output values and input values decreases as the torque applied in the presence of anisotropy increases, as shown in FIG. 20. When the heating temperature differs, the amount of anisotropy varies as does the state of creeping in the magnetostrictive films, and the gain varies depending on the heating temperature as shown in FIG. 21. However, it is difficult in the manufacturing steps to manage all heating temperatures and torques applied to the steering shaft in the presence of anisotropy, and manufacturing has been complicated. It has thereby been made difficult to widely provide torque sensors that are highly rigid, have a high degree of linearity, and have small uniformities among individual sensors. Therefore, in the manufacture of magnetostrictive torque sensor devices including the magnetostrictive torque sensor described above, there is a demand for a method that would reduce nonuniformities in the gain of magnetostrictive torque sensor devices as finished products.

SUMMARY OF THE INVENTION

According to an aspect of the present invention, there is provided a method for manufacturing a magnetostrictive torque sensor, which method comprises the steps of: providing a rotating shaft with magnetostrictive parts endowed with magnetic anisotropy; disposing detection coils around the magnetostrictive parts to detect changes in magnetostrictive characteristics of the magnetostrictive parts; providing a detection circuit for bringing out detection signals from signals outputted from the detection coils; and adjusting a gain of a gain adjuster included in the detection circuit.

In accordance with the invention, since the gain is adjusted by the gain adjuster of the detection circuit provided to the magnetostrictive torque sensor after the magnetostrictive torque sensor is installed in the gearbox, it is possible, even when there are variations in the applied torque or heating temperature and the amount of anisotropy or creep in the magnetostrictive films, to reduce nonuniformities in the gain of the magnetostrictive torque sensor output in a magnetostrictive torque sensor device that includes a magnetostrictive torque sensor in which the magnetostrictive films are heated while subjected to torque, the torque is canceled after cooling to create anisotropy, and detection coils detect changes in the magnetic characteristics of the magnetostrictive films. It is thereby possible to easily manufacture and widely distribute superior magnetostrictive torque sensor devices having high rigidity, good linearity, and minimal nonuniformities among individual sensors, and to reduce the management needed during the steps for providing anisotropy.

Since a gain-setting gain adjuster for electrically adjusting gain is provided, steps for sorting products according to characteristics are unnecessary, there is no need to prepare and store the sorted products in advance, and the assembly line can be simplified. It is thereby made possible to inexpensively manufacture and more widely distribute superior magnetostrictive torque sensor devices having high rigidity, good linearity, and minimal nonuniformities among individual sensors.

Preferably, the step of providing the magnetostrictive parts with magnetic anisotropy comprise the steps of: heating the rotating shaft while specific twisting torque is applied to the rotating shaft; and providing the magnetostrictive parts with magnetic anisotropy by canceling the twisting torque.

In a preferred form, the gain adjustment step adjusts the gain of the gain adjuster by means of a gain setting signal provided from the exterior.

It is preferred that the rotating shaft comprises a steering shaft.

The gain is adjusted by means of the combined detection coils, detection circuit, and steering shaft having the magnetostrictive parts, whereby nonuniformities in the gain in the detection coils and detection circuit can be compensated and the precision of the coils and electric components can be simplified. It is thereby possible to inexpensively manufacture and more widely distribute superior magnetostrictive torque sensor devices having high rigidity, good linearity, and minimal nonuniformities among individual sensors.

According to another aspect of the present invention, there is provided an electric power steering apparatus which comprises: a motor for providing a steering system with auxiliary torque; a steering torque sensor for sensing the steering torque of the steering system; and control means for drivably controlling the motor on the basis of at least a steering torque signal outputted from the steering torque sensor, wherein the steering torque sensor comprises a magnetostrictive torque sensor device manufactured by means of a manufacturing method which comprises the steps of: providing a steering shaft with magnetostrictive parts endowed with magnetic anisotropy; disposing detection coils around the magnetostrictive parts to detect changes in the magnetostrictive characteristics of the magnetostrictive parts; providing a detection circuit for bringing out detection signals from signals outputted from the detection coils; and adjusting a gain of a gain adjuster included in the detection circuit.

Enhanced steering comfort can be obtained using the magnetostrictive torque sensor device manufactured by means of the previously described manufacturing method as a steering torque sensor of an electric power steeling apparatus.

In a preferred form, the steps for providing the magnetostrictive parts with magnetic anisotropy comprises the steps of: heating the steering shaft while specific twisting torque is applied to the steering shaft, and providing the magnetostrictive parts with magnetic anisotropy by canceling the twisting torque.

Desirably, the gain adjustment step adjusts the gain of the gain adjuster by means of gain setting means for electrically setting the gain.

BRIEF DESCRIPTION OF THE DRAWINGS

Certain preferred embodiments of the present invention will be described in detail below, by way of example only, with reference to the accompanying drawings, in which:

FIG. 10 is a view showing a gain setting device as having been set up;

FIGS. 15(a) through 15(d) are views showing the detailed configuration of a torque transmission shaft of the electric power steering apparatus;

FIGS. 16(a) through 16(e) are views illustrating a method for manufacturing the torque transmission shaft and magnetostrictive films;

DESCRIPTION OF THE PREFERRED EMBODIMENTS

Figure 1:
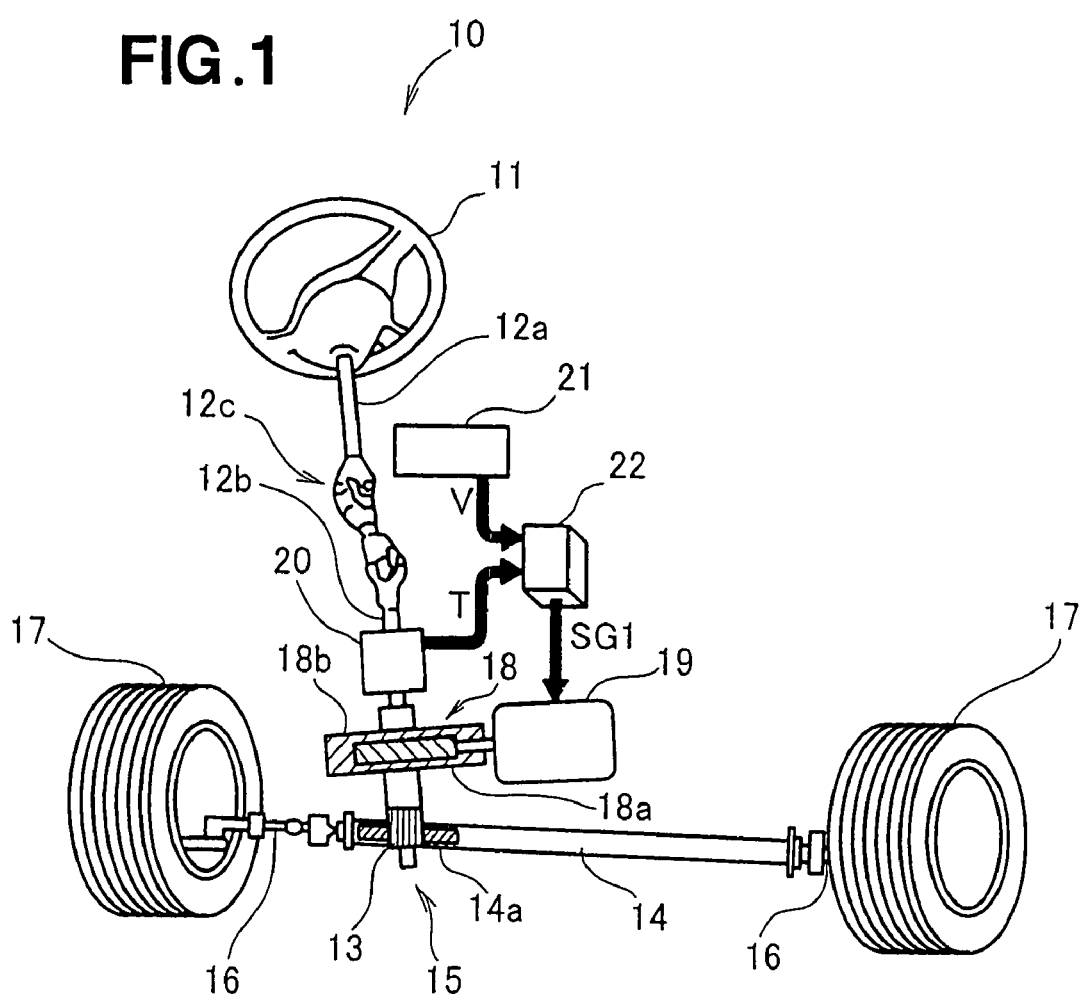
FIG. 1 is a schematic view showing the general arrangement of an electric power steering apparatus according to a first embodiment of the present invention.

Reference is made initially to FIG. 1 showing the overall arrangement of an electric power steering apparatus according to a first embodiment of the present invention. The electric power steering apparatus 10 is configured so that auxiliary steering torque is applied to a steering shaft 12a linked to a steering wheel 11. The steering shaft 12a is linked with a steering shaft 12b via a flexible drive coupling 12c, the top end of the steering shaft 12a is linked to the steering wheel 11, and a pinion 13 is attached to the bottom end of the steering shaft 12b. A rack shaft 14 is disposed on the pinion 13, providing a rack gear 14a that meshes with the pinion. A rack and pinion mechanism 15 is formed by the pinion 13 and the rack gear 14a. Tie-rods 16 are provided at both ends of the rack shaft 14, and front wheels 17 are attached to the outside ends of the tie-rods 16.

A motor 19 is provided to the steering shaft 12b via a power transmission mechanism 18. The power transmission mechanism 18 is formed by a worm gear 18a and a worm wheel 18b. The motor 19 outputs rotational force (torque) that assists the steering torque, and this rotational force is applied to the steering shafts 12b and 12a via the power transmission mechanism 18.

A steering torque sensor 20 is provided to the steering shaft 12b. The steering torque sensor 20 senses the steering torque applied to the steering shafts 12a and 12b when steering torque generated by the driver's operation of the steering wheel 11 is applied to the steering shafts 12a and 12b. Reference numeral 21 denotes a vehicle speed sensor for sensing the speed of the vehicle, while reference numeral 22 denotes a control device configured from a computer. The control device 22 receives a steering torque signal T outputted from the steering torque sensor 20 and a vehicle speed signal V outputted from the steering angle sensor 21, and outputs a drive control signal SG1 for controlling the rotating action of the motor 19 on the basis of information pertaining to the steering torque and information pertaining to the vehicle speed. The aforementioned rack and pinion mechanism 15 and other components are housed within a gearbox 24 (not shown in FIG. 1; see FIGS. 2 and 3).

The electric power steering apparatus 10 is configured by adding the steering torque sensor 20, the steering angle sensor 21, the control device 22, the motor 19, and the power transmission mechanism 18 to a common apparatus configuration for a steering system.

When the driver operates the steering wheel 11 to steer the traveling direction of the automotive vehicle while moving, rotational force based on the steering torque applied to the steering shafts 12a and 12b is converted by the rack and pinion mechanism 15 into linear movement in the axial direction of the rack shaft 14, and force is exerted to change the traveling direction of the front wheels 17 via the tie-rods 16. At this time, the steering torque sensor 20 provided to the steering shaft 12b simultaneously senses the steering torque corresponding to the steering of the driver in the steering wheel 11 and converts the torque into an electrical steering torque signal T, then outputs this steering torque signal T to the control device 22. The vehicle speed sensor 21 senses the speed of the vehicle and converts the speed into a vehicle speed signal V, then outputs this vehicle speed signal V to the control device 22.

The control device 22 generates a motor electric current for driving the motor 19 on the basis of the steering torque signal T and the vehicle speed signal V. The motor 19 driven by the motor electric current applies auxiliary steering force to the steering shafts 12b and 12a via the power transmission mechanism 18. The driving of the motor 19 as described above reduces the steering force applied by the driver to the steering wheel 11.

Figure 2:
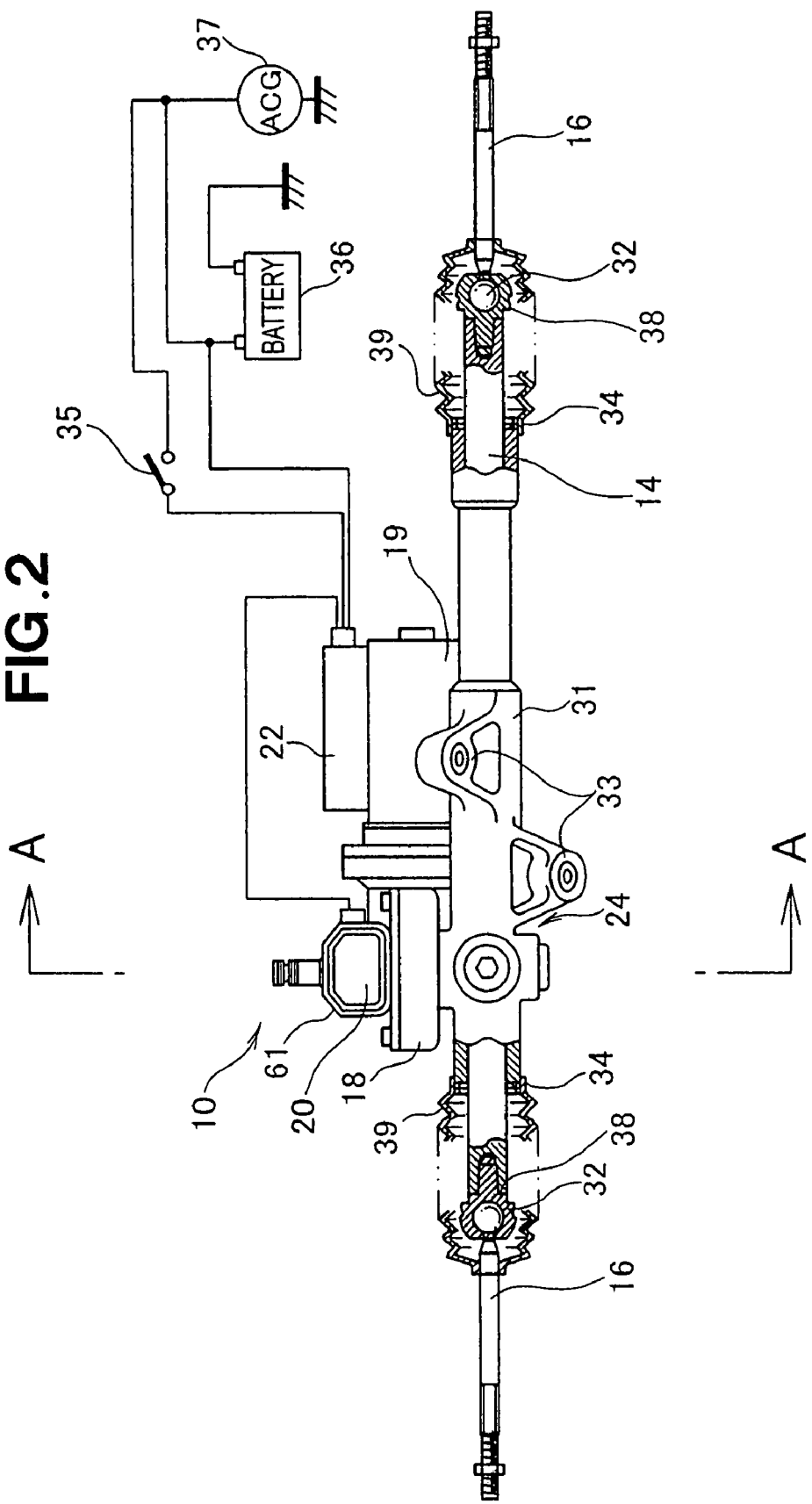
FIG. 2 is a schematic view showing a specific configuration of the electrical system and part of the mechanical arrangement of the electric power steering apparatus.

FIG. 2 shows the specific configuration of the electric system and part of the mechanical mechanisms of the electric power steering apparatus 10. The left and right ends of the rack shaft 14 are shown in cross section. The rack shaft 14 is housed within a cylindrical housing 31 disposed in the vehicle width direction (to the left and right in FIG. 2), and is capable of sliding in the axial direction. Ball joints 32 are joined by threading to both ends of the rack shaft 14 protruding from the cylindrical housing 31, and the left and right tie-rods 16 are linked to these ball joints 32. The housing 31 includes brackets 33 for attaching the housing to the vehicle frame (not shown), and also includes stoppers 34 at both ends.

The reference numeral 35 denotes an ignition switch, the reference numeral 36 indicates a vehicle battery, and the reference numeral 37 indicates an alternating-current generator (ACG) provided to the vehicle engine. The AC generator 37 initiates electricity generation with the operation of the vehicle engine. The necessary electric power is supplied to the control device 22 from either the battery 36 or the AC generator 37. The control device 22 is provided to the motor 19. The reference numerals 38 denote rack ends that come into contact with the stoppers 34 when the rack shaft moves, and the reference numerals 39 denote dust sealing boots for protecting the interior of the gearbox from water, mud, dust, and the like.

Figure 3:
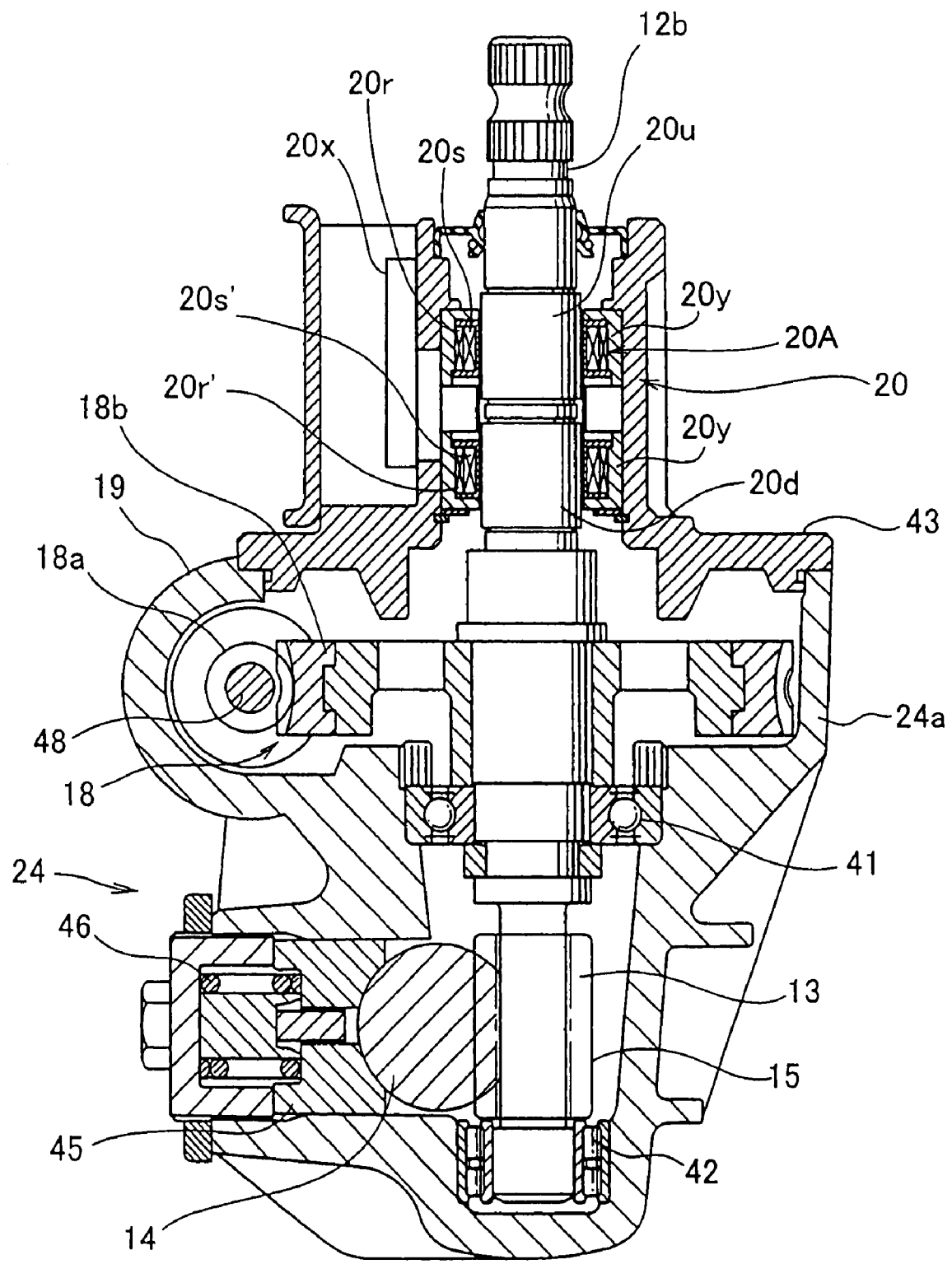
FIG. 3 is a cross-sectional view taken along line A-A of FIG. 2.

FIG. 3 is a cross-sectional view taken along line A-A of FIG. 2 and shows the specific configurations of the supporting structure of the steering shaft 12b, the steering torque sensor 20, the power transmission mechanism 18, and the rack and pinion mechanism 15.

The steering shaft 12b is rotatably supported by two bearings 41 and 42 within a housing 24a that forms the gearbox 24. The rack and pinion mechanism 15 and the power transmission mechanism 18 are housed in the interior of the housing 24a, and the steering torque sensor 20 is also provided at the top. Magnetostrictive films 20u and 20d are formed on the steering shaft 12b, and coils 20r, 20s, 20r', and 20s' are provided to these films and are enclosed by yoke parts 20y.

The top opening of the housing 24a is closed off by a lid 43, and the lid 43 is fastened with bolts. The pinion 13 provided at the bottom end of the steering shaft 12b is positioned between the bearings 41 and 42. The rack shaft 14 is guided by a rack guide 45, and is urged by a compressed spring 46 and pressed into the pinion 13. The power transmission mechanism 18 is formed by the worm gear 18a fastened to a transmission shaft 48 joined to the output shaft of the motor 19, and the worm wheel 18b fastened to the steering shaft 12b. The steering torque sensor 20 is attached to the lid 43.

The steering torque sensor 20 is configured from the magnetostrictive films 20u and 20d provided at two locations on the periphery of the steering shaft 12b composed of iron or another such ferromagnetic material, as well as the coils 20r and 20r' for detecting changes in the magnetization of the magnetostrictive films 20u and 20d, and the coils 20s and 20s' used as resistance, as shown in FIG. 3.

The yoke parts 20y are provided around the external peripheries of the coils 20r and 20r' and the coils 20s and 20s'. The steering torque sensor 20 is provided inside the steering/gearbox 24, and the sensor senses the steering torque applied to the steering shaft 12b. The sensed value is inputted to the control device 22 and is supplied to the motor 19 as a reference signal for generating appropriate auxiliary steering torque. The symbol 20x denotes a detection circuit.

The steering torque sensor 20 used herein is configured from a magnetostrictive torque sensor device. The device comprises a magnetostrictive torque sensor 20A composed of the magnetostrictive films of the steering shaft 12b and the multiturn coils around the peripheries thereof, and a detection circuit 20u for bringing out detection signals from the signals outputted from the detection coils.

As shown in FIG. 3, magnetostrictive films provided with magnetic anisotropy by forming, e.g., Ni—Fe plating on the surface of the steering shaft 12b are provided at two top and bottom locations (20u and 20d) over specific axial widths so as to be anisotropic in opposite directions, and the inverse magnetostrictive characteristics generated when steering torque is applied to the magnetostrictive films 20u and 20d are detected using the AC resistance and other attributes of the coils 20s and 20s' disposed around the magnetostrictive films 20u and 20d.

The control device 22 of the electric power steering apparatus 10 uses the steering torque signal T from the steering torque sensor 20 and the vehicle speed signal V from the vehicle speed sensor 21, and uses PWM to drive the supporting motor 19 that outputs auxiliary steering force, thus reducing the steering force for the driver.

Figure 4:
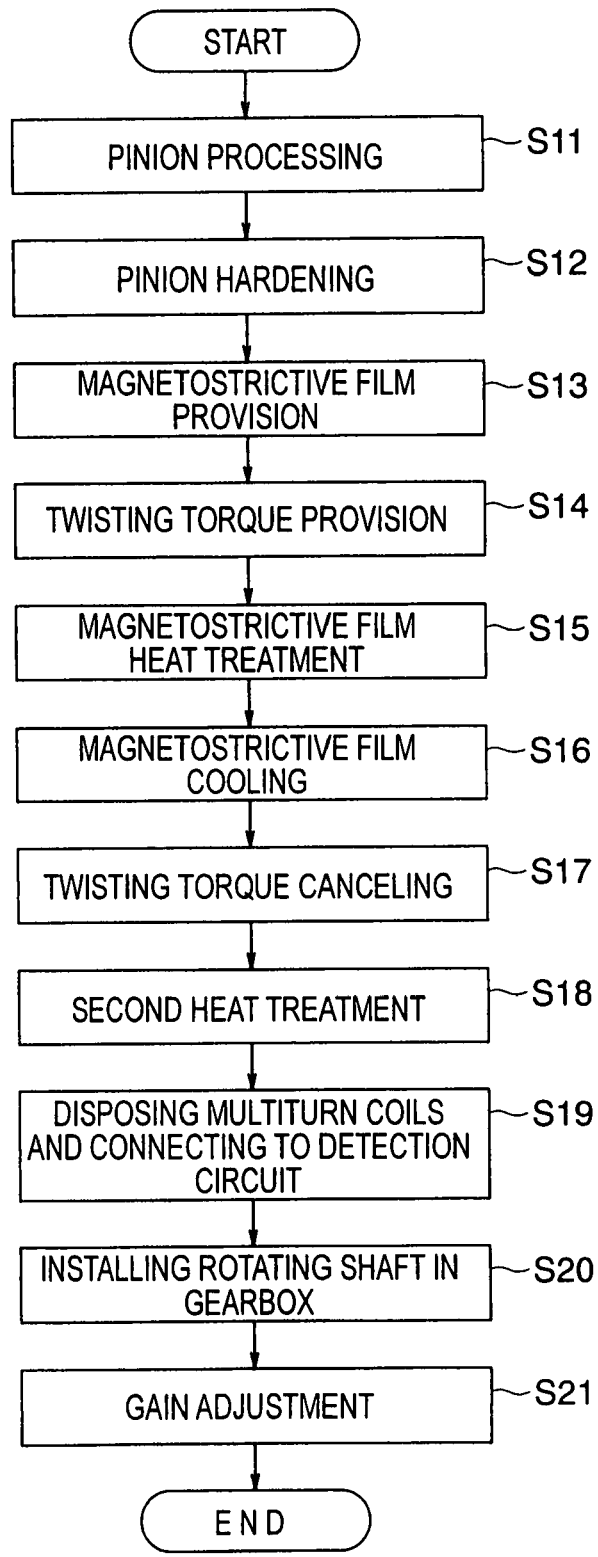
FIG. 4 is a flowchart showing a method of manufacturing the magnetostrictive torque sensor.

The method for manufacturing a magnetostrictive torque sensor device according to the present invention is now described with reference to the flowchart of FIG. 4. The process of the method for manufacturing a magnetostrictive torque sensor device includes a step for processing a pinion at the bottom end of the steering shaft (step S11), a step for hardening the pinion (step S12), a step for adding the magnetostrictive films (step S13), a step for applying twisting torque (step S14), a step for heat-treating the magnetostrictive films (step S15), a step for cooling the magnetostrictive films (step S16), a step for canceling the twisting torque (step S17), a step for performing another heat treatment (step S18), a step for disposing multiturn coils and connecting a detection circuit (step S19), a step for installing the rotating shaft in the gearbox (step S20), and a step for adjusting the gain by means of a gain adjuster provided to the detection circuit (step S21).

The steps are described hereinbelow.

Step S11: The pinion 13 is processed at the bottom end of the steering shaft 12b.

Step S12: The pinion 13 is hardened.

Step S13: The magnetostrictive films 20u and 20d are plated over the steering shaft 12b. The plating process is performed using a magnetostrictive material having a specific thickness (for example, 30 μm).

Step S14: After the plating process, twisting torque Tq is applied (counterclockwise at the top of the steering shaft 12b and clockwise at the bottom) to create stress in the peripheral surface of the steering shaft 12b. The twisting torque Tq applied is a greater twisting torque Tq than the twisting torque Tq applied in conventional manufacturing. For example, the twisting torque Tq in conventional practice is 70 N·m, whereas a twisting torque Tq of 75 N·m is applied in this case.

Step 15: While this twisting torque Tq remains applied, the periphery of the magnetostrictive film 20u is encircled with a coil, a high-frequency electric current is fed to the coil, and the magnetostrictive film 20u is heat-treated.

Step S16: After the heat treatment, the film is cooled naturally.

Step S17: After cooling, the twisting torque Tq is canceled. The preload torque (twisting torque remaining in the steering shaft 12b) is about −60 N·m.

Step S18: After the twisting torque Tq is canceled, another heat treatment is performed. In this second heat treatment, the heat treatment is performed for two hours at a temperature, e.g., 200° C., equal to or greater than the service temperature of the conditions in which the steering torque sensor 20 is used. The preload torque herein is about −55 N·m.

Step S19: After the second heat treatment, multiturn coils are disposed at positions corresponding to the magnetostrictive films 20u and 20d and are connected to the detection circuit.

Only the magnetostrictive film 20u is described herein, but the magnetostrictive film 20d is also provided with magnetic anisotropy through the steps S14 through S17. However, the twisting torque directions are mutually different.

Step S20: The rotating shaft is installed in the gearbox.

Step S21: The gain of the detection circuit is adjusted by means of the gain adjuster provided to the detection circuit.

Figure 5:
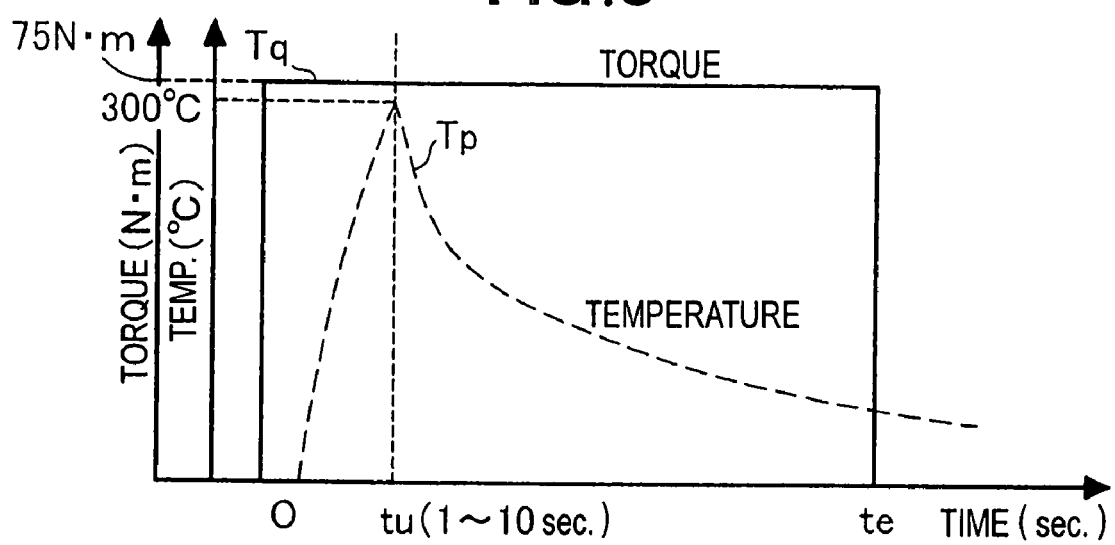
FIG. 5 is a graph showing the application of twisting torque Tq and the changes in temperature from a twisting torque application step until a twisting torque cancellation step.

FIG. 5 is a graph showing the extent of applied twisting torque (Tq) and the change in temperature (Tp) from the twisting torque application step (step S14) to the twisting torque cancellation step (step S17). The solid line (Tq) having the shape of a step represents the extent of applied twisting torque, and the dashed line Tp represents the change in temperature.

Figure 6:
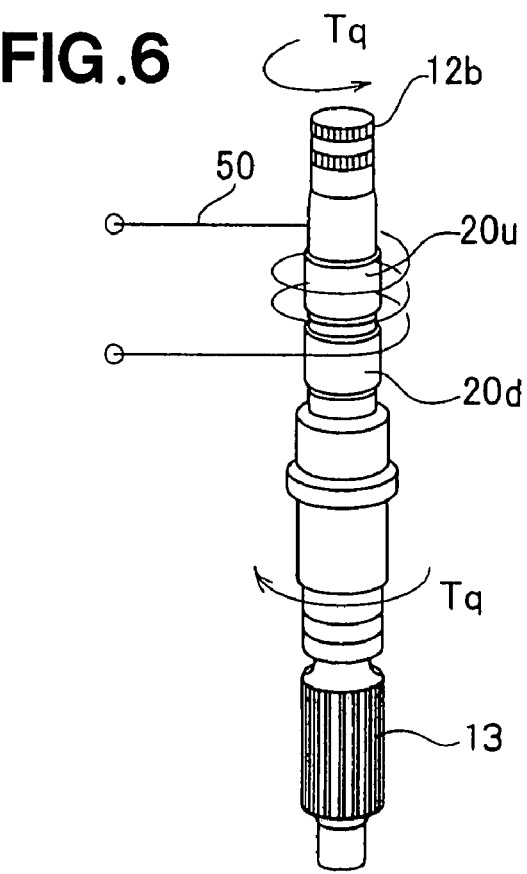
FIG. 6 is a view showing a heat treatment step.

FIG. 6 is a view showing the steering shaft 12b in the magnetostrictive film heat treatment step (step S15). A twisting torque (Tq) of 75 N·m, for example, is applied as shown by the arrows to the top and bottom ends of the steering shaft 12b, and a heating coil 50 is heated by feeding a high-frequency electric current. This heat treatment is performed by disposing the coil 50 around the magnetostrictive film 20u at a heat-treated position as shown in FIG. 6, and by feeding a high-frequency electric current of 500 KHz to 2 MHz, for example, over a time tu of 1 to 10 seconds. The temperature is thereby brought to 300° C. after tu seconds. The coil 50 is also used to heat the magnetostrictive film 20d in the same manner as the magnetostrictive film 20u. Heating is stopped at this point, or, in other words, the electric current supply is stopped, and the films are cooled (step S16). When the temperature falls to a specific temperature (for example, after te seconds), the twisting torque Tq is canceled (step S17).

Figure 7:
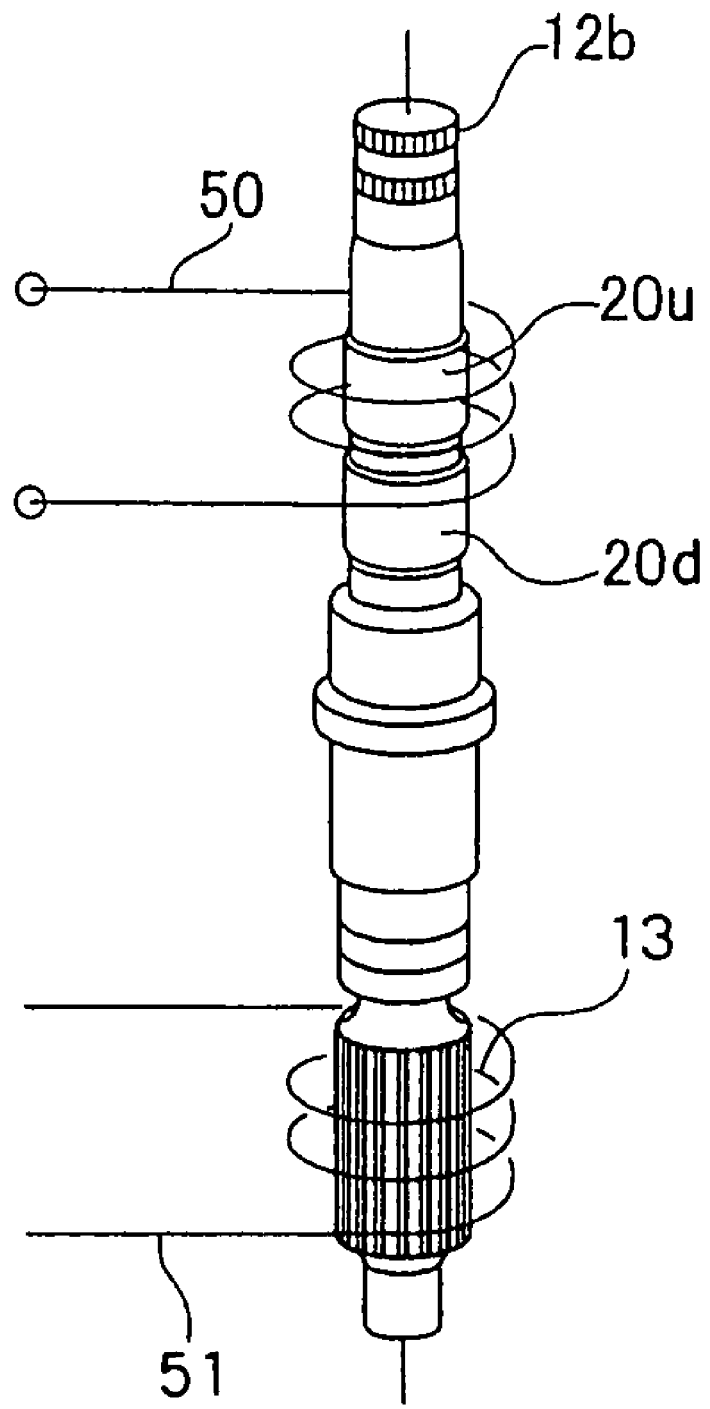
FIG. 7 is a view showing a second heat treatment step.

FIG. 7 is a view showing the steering shaft 12b in the second heat treatment step (step S18). A high-frequency electric current is fed to the two coils 50 and 51 to heat the steering shaft 12b. This heat treatment is performed by disposing the coils 50 and 51 around the magnetostrictive films 20u and 20d and the pinion 13 at heat-treated positions, as shown in FIG. 7, and by feeding a high-frequency electric current of 500 KHz to 2 MHz, for example, to the coils 50 and 51 for several minutes. The electric current is adjusted so that the temperature herein is 200° C.

Figure 8:
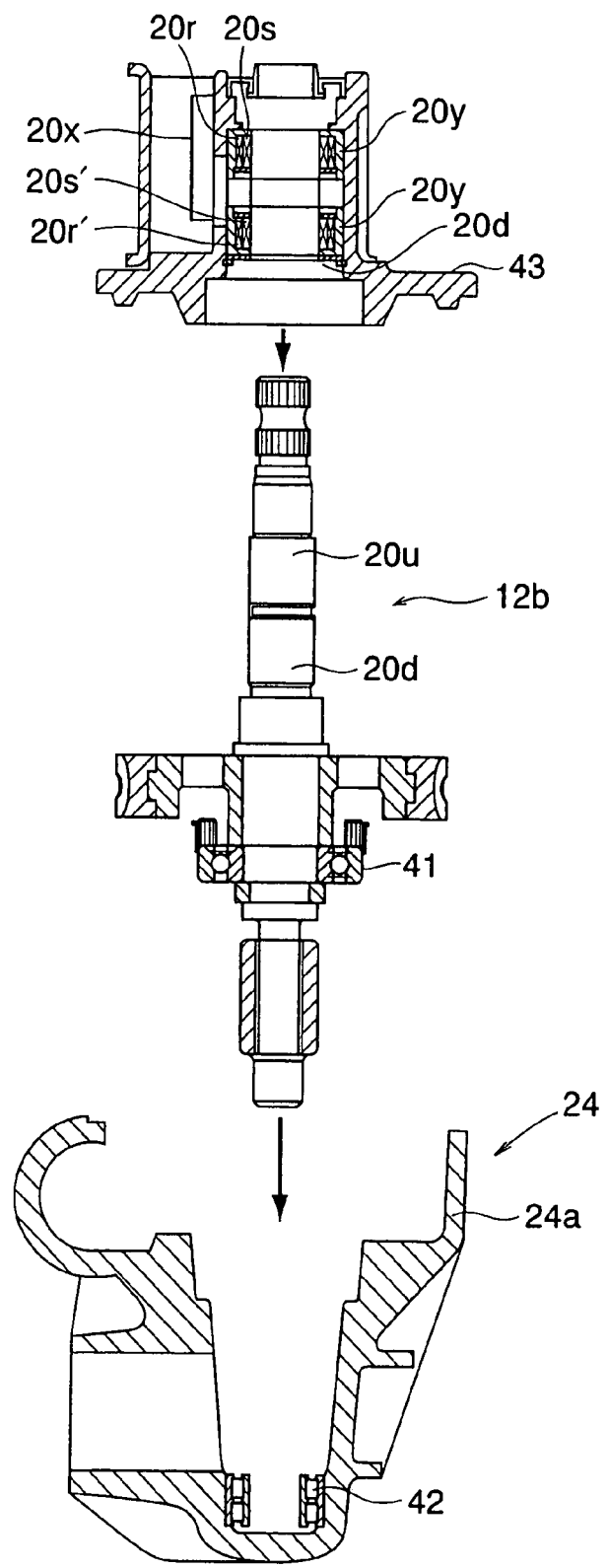
FIG. 8 is a view of the step of disposing multiturn coils and connecting a detection circuit, and the step of installing the circuit in a gearbox.

FIG. 8 shows the step (step S19) for disposing the multiturn coils at positions corresponding to the disposed positions of the magnetostrictive films 20u and 20d on the steering shaft 12b after the second heat treatment, and also shows step S20 wherein the steering shaft 12b is installed in the gearbox 24. First, the lid 43 is disposed so that the coils 20r, 20s, 20r', and 20s', which are multiturn coils, are disposed at positions encircling the magnetostrictive films 20u and 20d on the steering shaft 12b. The bearings 41 and 42 are then used to dispose the steering shaft 12b on the housing that forms the gearbox 24.

Figure 9:
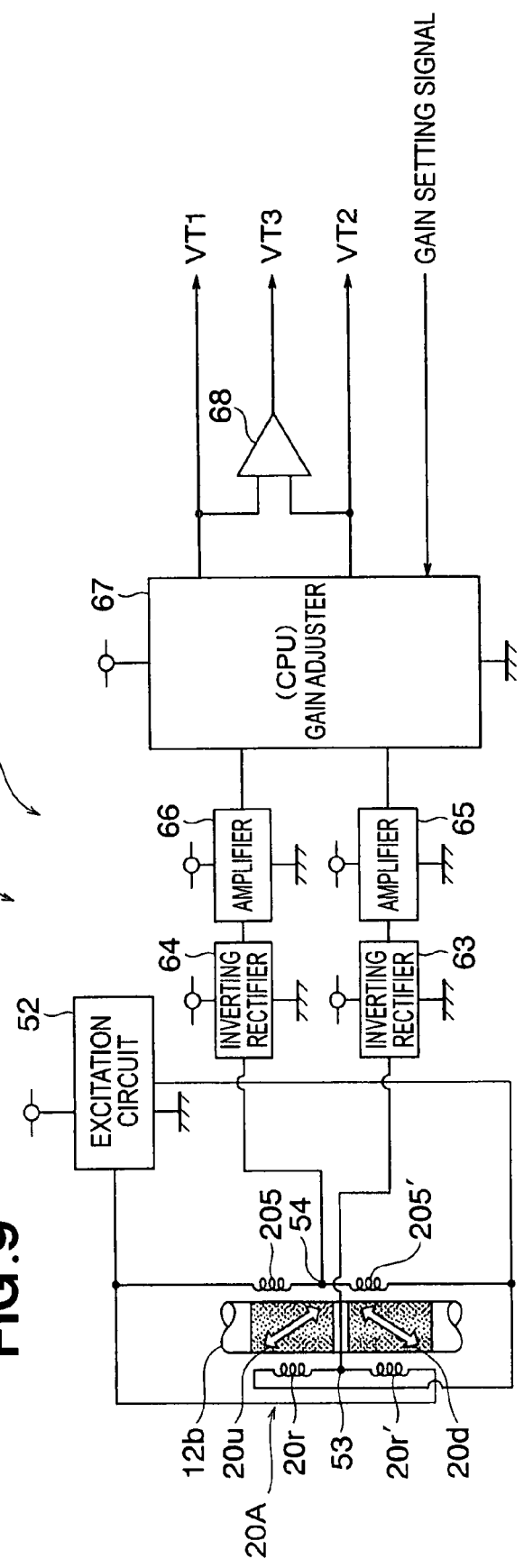
FIG. 9 is a diagram showing a circuit arrangement of the detection circuit.

FIG. 9 is a view showing the circuit configuration of a detection circuit 20x attached to the magnetostrictive torque sensor 20A.

In the magnetostrictive torque sensor 20A, the magnetostrictive films 20u and 20d are deposited at two locations on the steering shaft 12b so as to be inversely magnetically anisotropic. When torque is applied to the steering shaft 12b, the magnetostrictive films 20u and 20d act as magnetic characteristic-varying parts whose magnetic characteristics vary according to the torque. In this circuit, the coils 20r' and 20s are provided around the peripheries of the magnetostrictive films 20u and 20d, and these coils detect the change in magnetization in the magnetostrictive films as a change in impedance when torque is applied to the steering shaft 12b. The coil elements 20r and 20s' are connected in series to the coils 20r' and 20s so that an electric circuit is formed. An excitation circuit 52 is also included, and the circuit is configured from switching elements (not shown) for applying voltage in specific cycles respectively to the two series circuits formed by the coils and the elements, and from a constant-voltage source (not shown) connected thereto.

Detection terminals 53 and 54 are provided at the connection between the coils 20r and 20r' and at the connection between the coils 20s and 20s' in order to detect changes in voltage at both ends of the coils 20r' and 20s. The detection circuit 20x includes two inverting rectifiers 63 and 64 for inverting and rectifying the voltage changes outputted from the two detection terminals 53 and 54 and for outputting DC voltages, and amplifiers 65 and 66 for amplifying the DC voltages outputted from the inverting rectifiers. The detection circuit 20x also includes a gain adjuster 67 for multiplying the outputs from the two amplifiers 65 and 66 by the set gain and outputting the result. The gain adjuster 67 is preferably configured from a CPU, and the gain adjustment function is preferably implemented by software. The detection circuit 20x furthermore includes a calculator 68 for calculating the difference between the two DC voltages outputted from the gain adjuster 67.

Next, the operation of the steering torque sensor 20 configured as described above will be described. The switching elements (not shown) included in the excitation circuit 52 are repeatedly turned on and off in specific cycles, and the steering torque is detected.

When the switching elements are turned on and off, an electric current is fed to the circuit containing the coils (resistance) 20r' and 20s' and the coils 20r and 20s, and a change in voltage occurs at the terminals 53 and 54. The inductance of the coils at this time is L(μ). DC voltages are outputted from the inverting rectifiers 63 and 64. The output voltages have values that differ depending on the difference in inductance L(μ). The inductance L(μ) depends on the magnetic permeability μ of the magnetostrictive films, and since the magnetic permeability μ is varied by applying torque to the magnetostrictive films, the steering torque can be sensed by measuring the voltage.

The amplifiers 65 and 66 amplify the inputted DC voltages and pass the voltages on to the gain adjuster 67. The gain adjuster 67 multiplies the inputted DC voltages by a preset gain and outputs the results as VT1 and VT2. The calculator 68 at the next stage outputs VT3, which is the difference between VT1 and VT2. The torque can be sensed with minimal nonuniformities in gain by adjusting the gain adjuster 67 after the steering shaft 12b is installed in the gearbox 24.

FIG. 10 shows the configuration of the device for setting the gain when the gain is set in the gain adjuster 67. FIG. 10 is a view of a gain-setting device 70 having been set up after the steering wheel 11 has been attached to the steering shaft 12b of the electric power steering apparatus 10 shown in FIG. 2. The gain-setting device 70 is configured from a steering torque measurement amplifier 71, a torque signal monitor 72, and a gain setting writing device 73. The steering torque measurement amplifier 71 measures the steering torque from the steering wheel 11 of the electric power steering apparatus 10, and amplifies the measured value and outputs the result to the torque signal monitor 72. The torque signal monitor 72 monitors the signals from the steering torque measurement amplifier 71 and the signals VT1, VT2, and VT3 from the magnetostrictive torque sensor device 20. The gain setting writing device 73 adjusts and sets the gain of the gain adjuster 67 on the basis of the signals from the steering torque measurement amplifier 71 and the signals from the magnetostrictive torque sensor device 20, which are monitored by the torque signal monitor 72.

The gain is set in the following manner. Using the gain-setting device 70 shown in FIG. 10, the output from the steering torque sensor 20 and the output from the steering torque measurement amplifier 71 are shown on the torque signal monitor 72. Next, the reference gain outputted by the steering torque measurement amplifier 71 and the output gain of the magnetostrictive torque sensor device 20 are compared, and the gain ratio is calculated to obtain a torque sensor gain adjustment value. Next, the gain setting writing device 73 is used to write the torque sensor gain adjustment value into the gain adjuster 67 of the detection circuit 20x. The gain adjuster 67 outputs a gain adjustment value signal, and the control device 22 performs control on the basis of the gain adjustment value signal and the torque signal VT3.

Figure 11A:
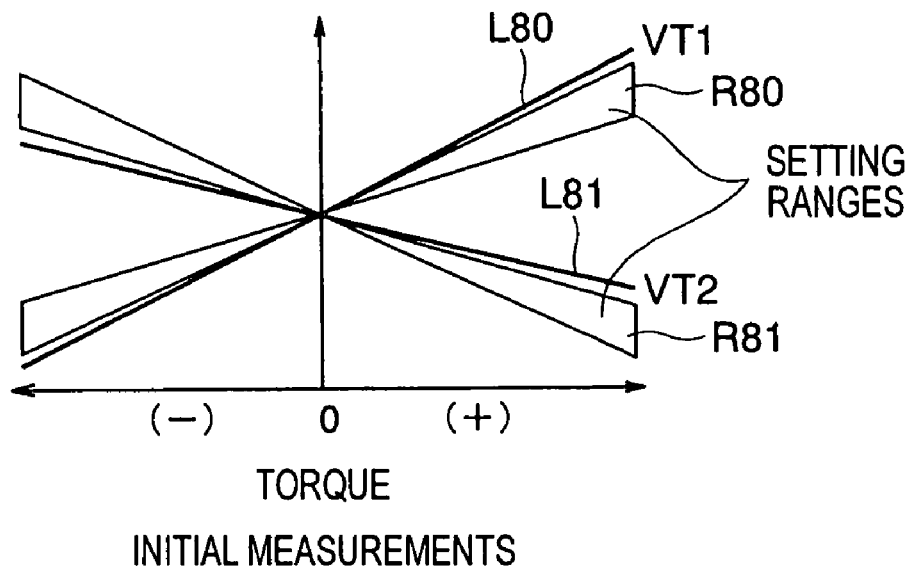
FIGS. 11(a) and 11(b) are graphs showing relationships of torque sensing voltage to torque before and after a gain adjuster is adjusted and set by the gain setting device.
Figure 11B:
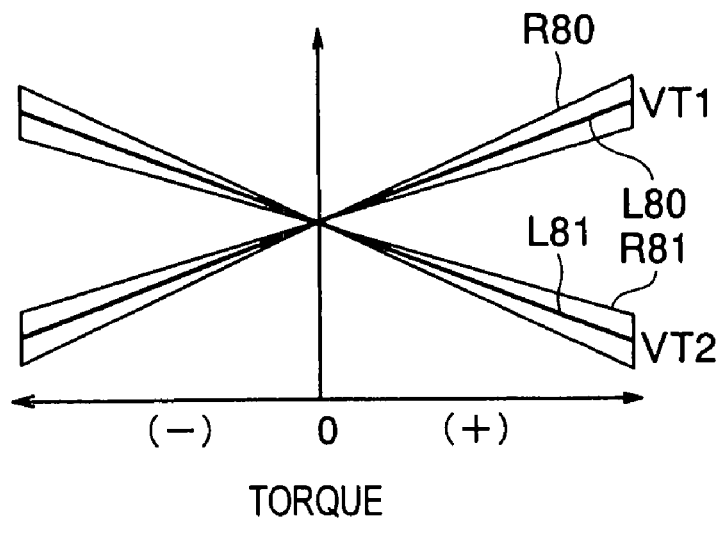

FIG. 11 is a graph showing the relationship of torque sensing voltage to torque (steering torque) before and after the gain-setting device 70 adjusts and sets the gain adjuster 67. FIG. 11(a) shows the relationship of torque-torque sensing voltage before the gain is adjusted and set, and FIG. 11(b) shows the relationship of torque-torque sensing voltage after the gain is adjusted and set. The gain setting writing device 73 adjusts and sets the gain in the gain adjuster 67 so that the two relationships (line L80 and line L81) between torque and the torque sensor signals VT1 and VT2 are within the setting ranges R80 and R81, respectively, shown in FIG. 11(a). FIG. 11(b) is a graph showing the relationship between the torque and the torque sensing voltage after the gain is adjusted and set. Since these relationships are bilaterally symmetric after the gain is adjusted and set as shown in FIG. 11(b), only the right torque need be viewed. Adjusting and setting the gain in this manner makes it possible to obtain a relationship between torque and torque sensing voltage such as the one shown in FIG. 11(b). This is because the gain is set in relation to the torque values even when the gain is varied by the nonuniformities in applied torque during the application of anisotropy to the magnetostrictive films.

Thus, the method for manufacturing the magnetostrictive torque sensor device 20 of the present invention produces less nonuniformity than when a single magnetostrictive torque sensor is adjusted. Also, error elements brought about by the gearbox 24 (for example, deviation to the left or right due to meshing of the gears) occur when the magnetostrictive torque sensor is actually installed in a vehicle, even if the single sensor is perfectly adjusted. Consequently, high-precision adjustments that include these elements can be made by adjusting the gain after [the device] has been installed in the gearbox 24. As a result, it is possible to provide a magnetostrictive torque sensor device that has sufficiently high detection precision.

Figure 12:
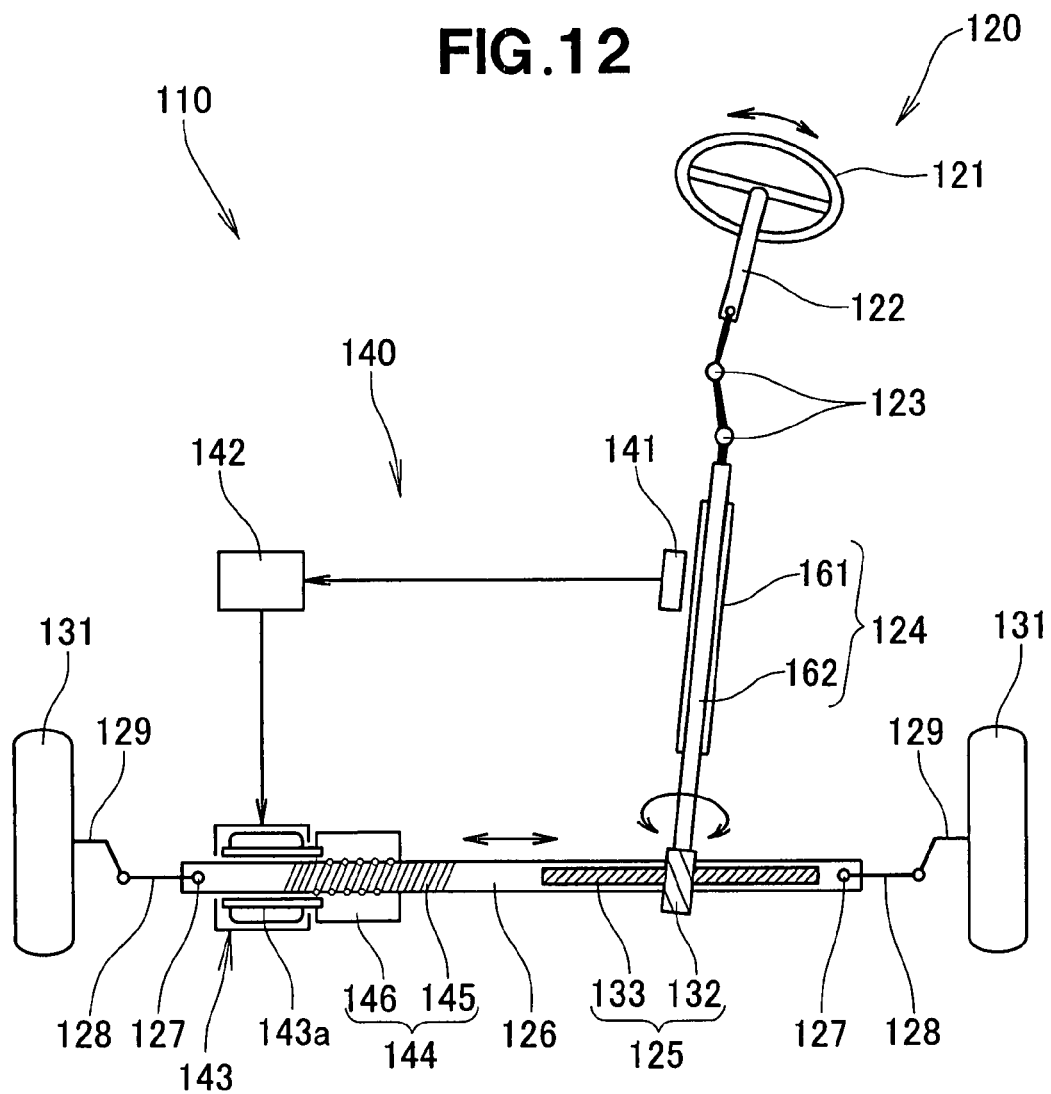
FIG. 12 is a view schematically illustrating the system configuration of the electric power steering apparatus according to a second embodiment of the present invention.

FIG. 12 is a schematic view of the electric power steering apparatus according to the second embodiment of the present invention.

An electric power steering apparatus 110 is composed of a steering system 120 that extends from a steering wheel 121 of a vehicle to steered wheels (e.g., front wheels) 131, 131 of the vehicle, and an auxiliary torque mechanism 140 for applying auxiliary torque to the steering system 120.

The steering system 120 has a configuration wherein a torque transmission shaft 124 is linked to the steering wheel 121 via a steering shaft 122 and flexible drive couplings 123, 123, a rack shaft 126 is linked to the torque transmission shaft 124 via a rack and pinion mechanism 125, and left and right steered wheels 131 are linked to the ends of the rack shaft 126 via ball joints 127, tie-rods 128, and knuckles 129.

The rack and pinion mechanism 125 is composed of a pinion 132 provided to the torque transmission shaft 124, and a rack 133 formed on the rack shaft 126.

The driver steers the steering wheel 121, whereby the left and right steered wheels 131, 131 can be steered with the aid of the steering torque via the rack and pinion mechanism 125, the rack shaft 126, and the tie-rods 128, 128.

Thus, in the electric power steering apparatus 110, the steering torque corresponding to the steering of the steering wheel 121 is transmitted to the rack shaft 126 via the rack and pinion mechanism 125, whereby the steered wheels 131, 131 are steered via the rack shaft 126.

The auxiliary torque mechanism 140 is a mechanism wherein the steering torque of the steering system 120 applied to the steering wheel 121 is sensed by a magnetostrictive torque sensor device 141, a control signal is generated by a controller 142 on the basis of a steering torque sensory signal, an electric motor 143 generates auxiliary torque (motor torque) corresponding to the steering torque on the basis of this control signal, and the auxiliary torque is transmitted to the rack shaft 126 via a ball screw 144.

A motor shaft 143a of the electric motor 143 is a hollow shaft enclosing the rack shaft 126. The ball screw 144 is a power transmission mechanism composed of a thread 145 formed on the portion of the rack shaft 126 other than the rack 133, a nut 146 threaded over the thread 145, and a large number of balls (not shown). The nut 146 couples with the motor shaft 143a.

In this electric power steering apparatus 110, the steering torque transmitted to the torque transmission shaft 124 can be sensed by the magnetostrictive torque sensor device 141, and the steering torque for steering the steering wheel 121 can be transmitted to the rack shaft 126 via the torque transmission shaft 124 and the rack and pinion mechanism 125. The rack shaft 126 can then steer the steered wheels 131, 131 by means of the composite torque resulting from the addition of the auxiliary torque of the electric motor 143 to the steering torque of the driver.

Figure 13:
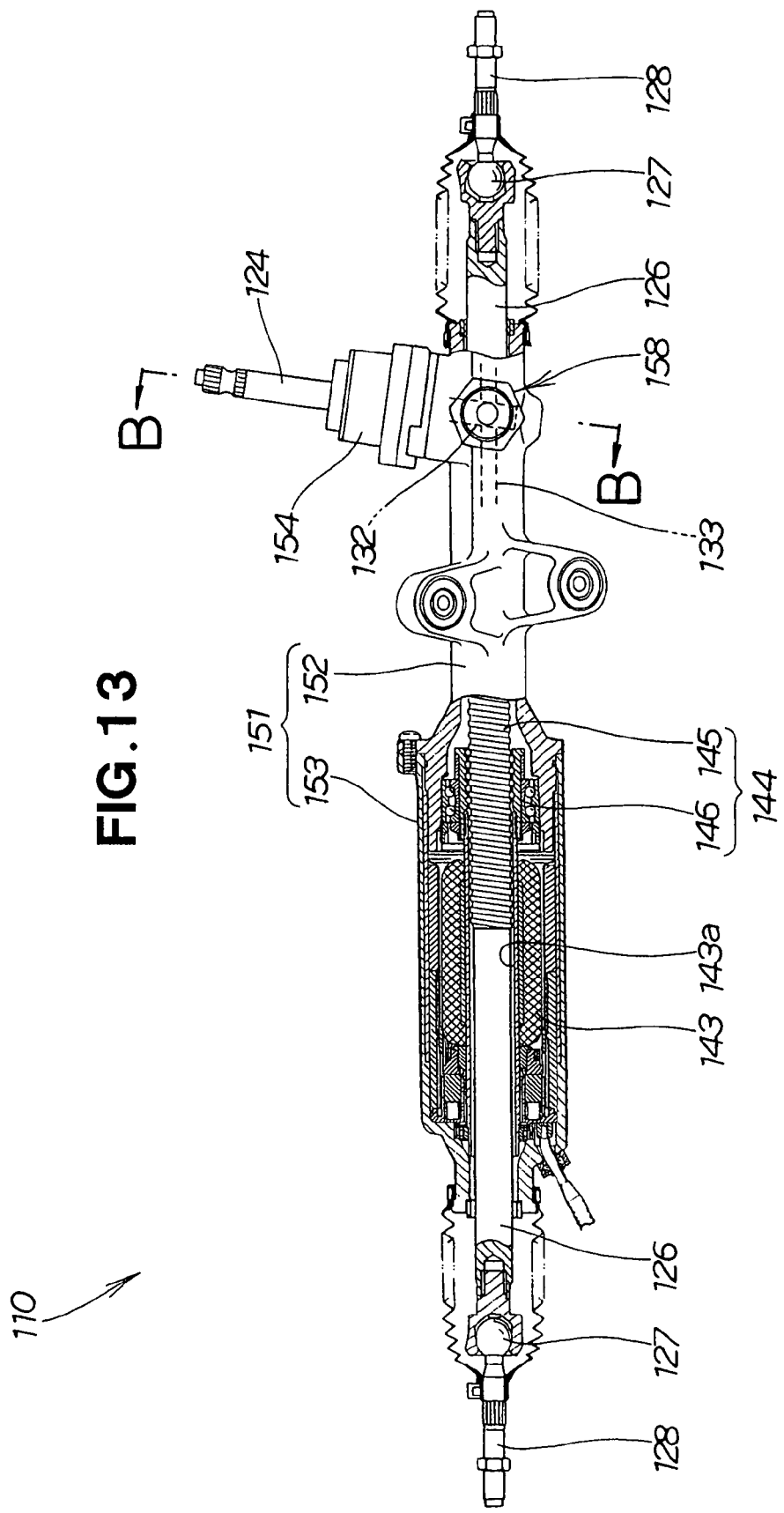
FIG. 13 is a schematic view illustrating an overall configuration of the electric power steering apparatus according to the second embodiment.
Figure 14:
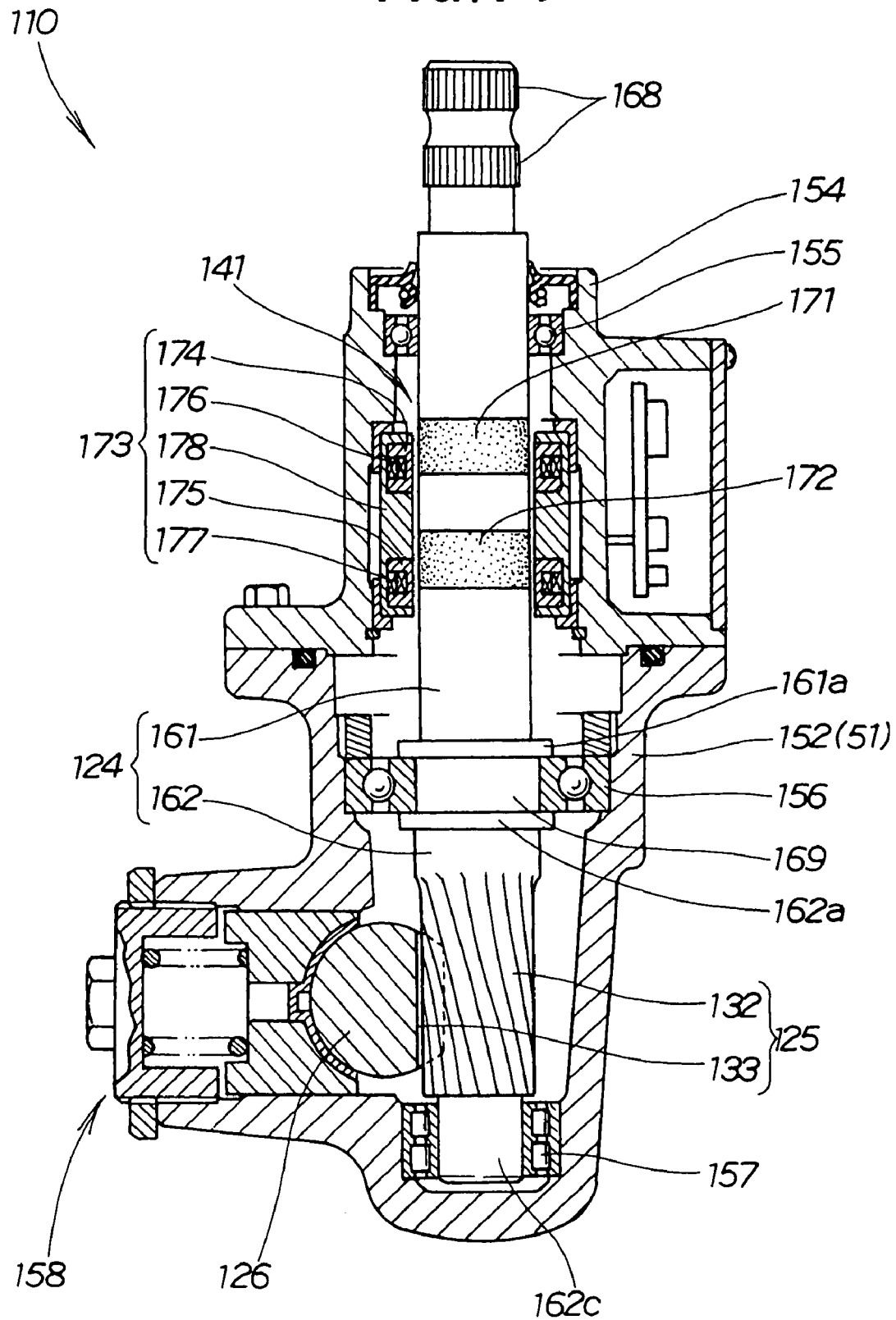
FIG. 14 is a cross-sectional view taken along line B-B of FIG. 13.
Figure 17:
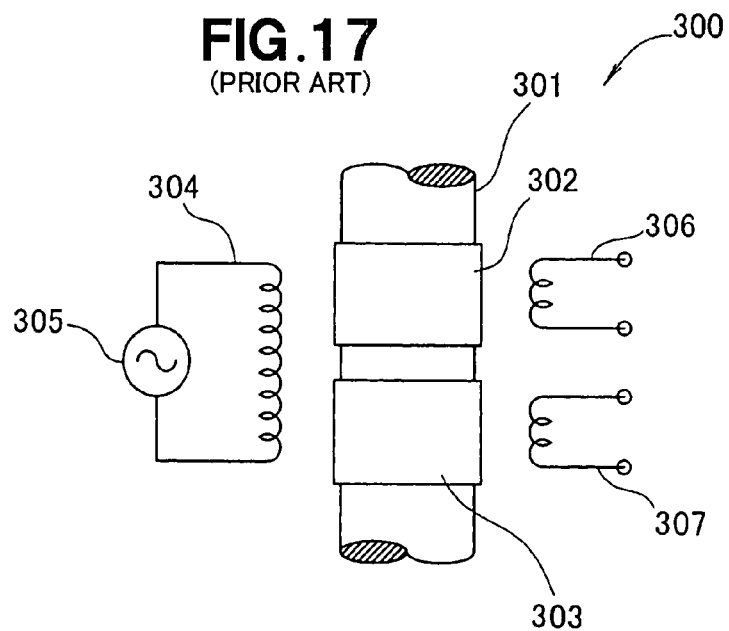
FIG. 17 is a schematic view of a conventional magnetostrictive torque sensor.
Figure 18:
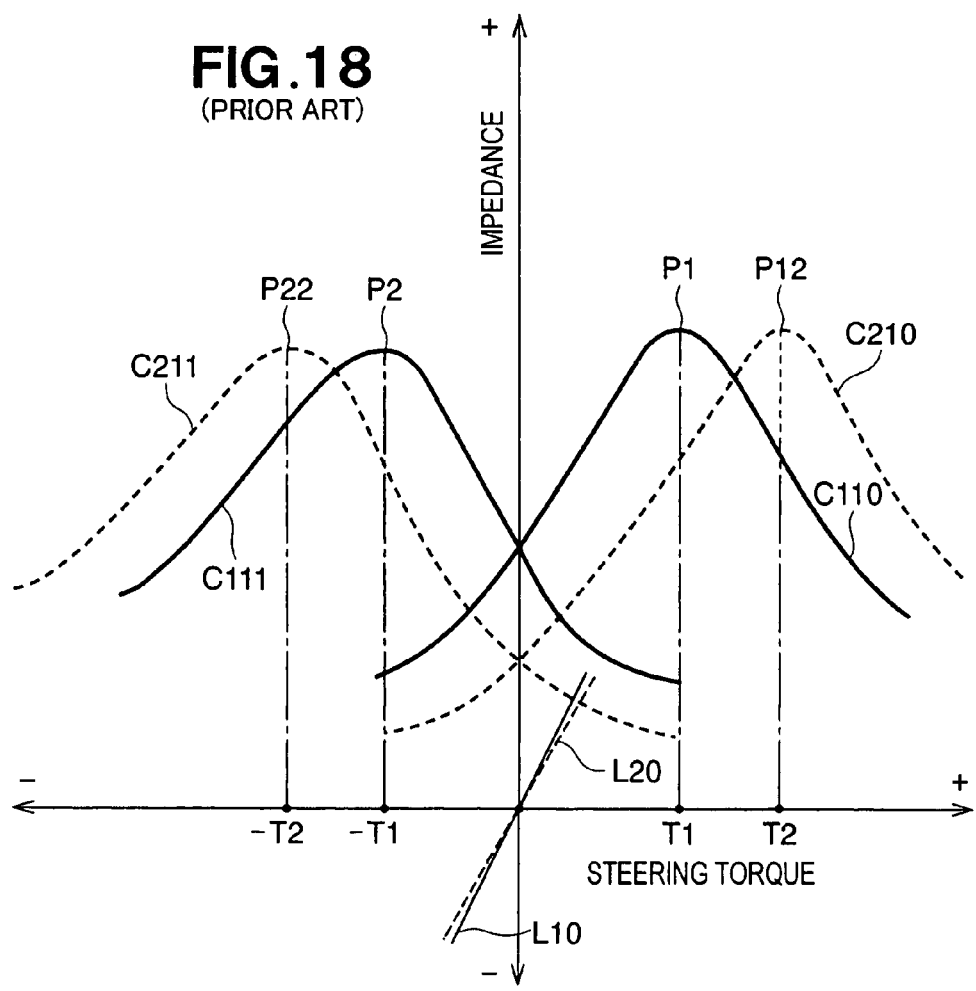
FIG. 18 is a graph showing magnetostrictive characteristics.
Figure 19:
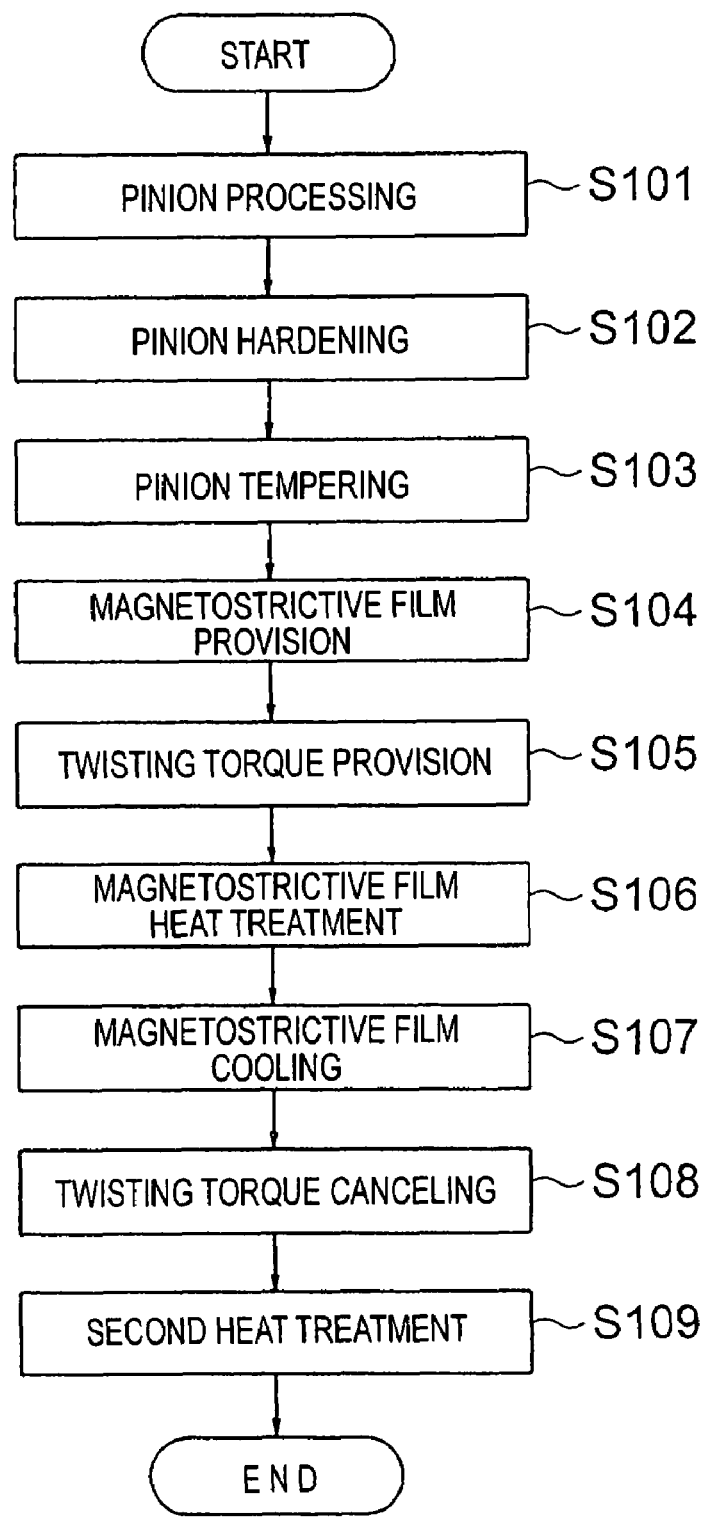
FIG. 19 is a flowchart showing a method for manufacturing a conventional magnetostrictive torque sensor.
Figure 20:
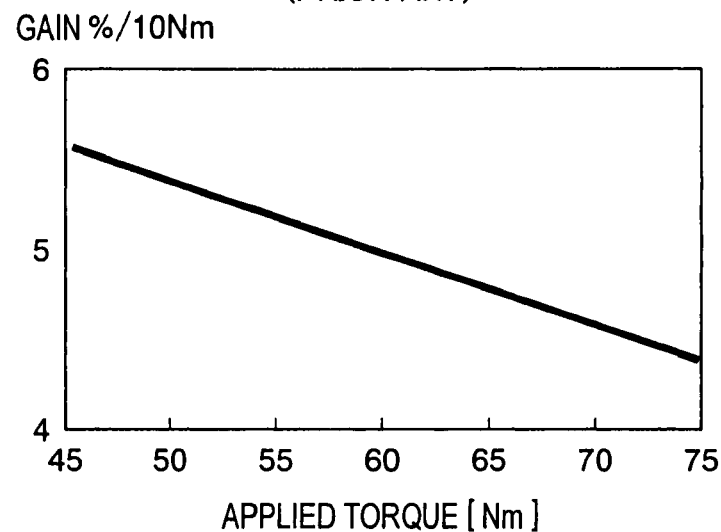
FIG. 20 is a graph showing a change in gain in relation to applied torque when anisotropy is provided.
Figure 21:
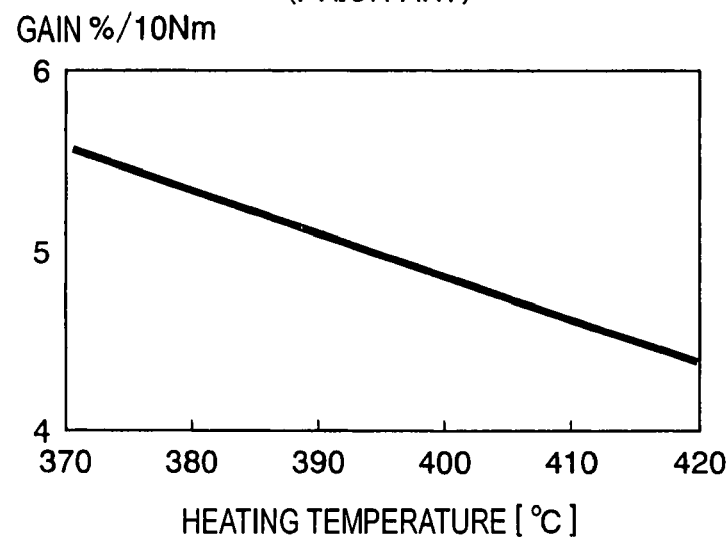
FIG. 21 is a graph showing a change in gain in relation to heating temperature when anisotropy is provided.

FIG. 13 is an overall structural view of a partial cross section of the electric power steering apparatus according to the second embodiment, wherein the left and right ends are shown in cross section. FIG. 14 is a cross-sectional view along the line B-B in FIG. 13.

As shown in FIGS. 13. and 14, in the electric power steering apparatus 110, the torque transmission shaft 124, the rack and pinion mechanism 125, the electric motor 143, the ball screw 144, and the magnetostrictive torque sensor device 141 are housed within a housing 151 extending in the vehicle width direction (to the left and right in FIG. 13).

The housing 151 is attached to a long, thin gearbox by using bolts to fasten together the end surfaces of a roughly tubular first housing 152 and second housing 153. The second housing 153 doubles as a motor case for the electric motor 143.

The first housing 152 is closed off at the top opening by a lid 154, and the top end, longitudinal center, and bottom end of the torque transmission shaft 124 are rotatably supported via three top, middle, and bottom bearings 155 through 157, whereby the first housing is set longitudinally. The first housing also includes a rack guide 158.

The rack guide 158 regulates the movement of the rack shaft 126 in the longitudinal direction of the torque transmission shaft 124 as well as regulating the movement of the rack shaft 126 in the direction in which the meshing of the pinion 132 and rack 133 separates. The rack guide can also sidably support the rack shaft 126 in the axial direction.

Next, the details of the torque transmission shaft 124 will be described based on FIGS. 14 and 15.

FIGS. 15(a) through 15(d) are structural views of the torque transmission shaft according to the present invention, wherein FIG. 15(a) shows an exploded structure of the torque transmission shaft 124, FIG. 15(b) shows a cross-sectional structure of the assembled torque transmission shaft 124, FIG. 15(c) shows a cross-sectional structure along the line C-C in FIG. 15(b), and FIG. 15(d) shows an external view of the assembled torque transmission shaft 124.

The torque transmission shaft 124 is composed of a torque-side shaft 161 and a pinion shaft 162 aligned coaxially, and this torque-side shaft 161 and pinion shaft 162 are configured from separate members that are fitted and linked together.

The torque-side shaft 161 and pinion shaft 162 are composed of, e.g., iron and steel (including nickel-chrome-molybdenum steel) or another such ferromagnetic material, i.e., a magnetic material.

The torque-side shaft 161 is composed of a fitting hole (hollow part) 165 as well as a cylindrical shaft (hollow shaft) having a substantially hexagonal flange 161a at one end, and the torque-side shaft has two pin holes 166, 166 that pass through the fitting hole 165 at a direction orthogonal to the axis. The fitting hole 165 is a through-hole that has a square-shaped or other such polygonal cross section, and that is formed in the center of the torque-side shaft 161 that has a circular cross section, as shown in FIG. 15(c). The two pin holes 166, 166 are disposed in proximity to the ends of the torque-side shaft 161.

The pinion shaft (operating shaft) 162 is a solid shaft wherein a supported part 162c, a pinion 132, a jig catch 162b, a flange 162a, a supported part 169, and a fitting shaft 163 are aligned in this sequence from one end to the other and are formed integrally. These members 132, 162a, 162b, 162c, 163, and 169 are aligned coaxially with the pinion shaft 162. The supported part 162c at the bottom end is supported by the lowest bearing 157, and the supported part 169 is supported by the middle bearing 156, as shown in FIG. 14.

More specifically, the pinion shaft 162 includes the pinion 132 formed at one end, the long and thin small-diameter fitting shaft 163 extending from the other end surface towards the fitting hole 165, the supported part 169 formed on the external peripheral surface between the pinion 132 and the proximal end of the fitting shaft 163, and the substantially circular flange 162a and jig catch 162b formed between the pinion 132 and the supported part 169. The jig catch 162b is a portion that catches on a jig, which is described later.

The fitting shaft 163 is longer than the entire torque-side shaft 161 and passes through the fitting hole 165. The fitting shaft also has a linking part 168 for linking to the flexible drive coupling 123 at the distal end protruding from the fitting hole 165. The linking part 168 may, for example, be composed of serrations.

Furthermore, the fitting shaft 163 has two fitting ridges 163a, 163a formed in proximity to the ends in the longitudinal direction, and a jig catch 163b formed between one fitting ridge 163a and the linking part 168. The jig catch 163b is a portion that catches on a jig, which is described later.

The fitting ridges 163a, 163a are ring-shaped members that have the same shapes in cross section as the fitting hole 165 as shown in FIG. 15(c). The fitting ridges protrude so as to encircle the external periphery of the fitting shaft 163, and the ridges have pin holes 164, 164 that pass through in a direction orthogonal to the respective axes. The positions of the pin holes 164, 164 in the fitting ridges 163a, 163a are designed to coincide respectively with pin holes 166, 166 in the torque-side shaft 161. The diameter of the fitting hole 165 is designed to be smaller than the diameter of the supported part 169.

The process of assembling the torque transmission shaft 124 is as follows.

First, bottom holes that are slightly smaller in diameter than the pin holes 166, 166 are formed in the torque-side shaft 161 at the positions of the pin holes 166, 166. Neither the pin holes 164, 164 nor bottom holes thereof are formed in the pinion shaft 162 at this point.

Next, while the torque transmission shaft 124 is still disassembled, the bearing 156 (see FIG. 14) is fitted in the supported part 169 of the pinion shaft 162, and the inner race of the bearing 156 is brought into contact with the end surface of the flange 162a. The bearing 156 can thereby be fitted in and attached to the pinion shaft 162.

Next, the fitting shaft 163 is press-fitted into the fitting hole 165, and the two flanges 161a and 162a sandwich the bearing 156.

Next, the top pin holes 164 and 166 and the bottom pin holes 164, and 166 are formed through the fitting shaft 163 at the position of the bottom hole of the torque-side shaft 161.

Next, pins 167, 167 are inserted through the pin holes 164, 164, 166, 166. As a result, the torque-side shaft 161 and the pinion shaft 162 can be integrally linked together by means of the pins 167, 167 and can be assembled in a single torque transmission shaft 124, as shown in FIGS. 15(b) and 15(c). The operation of assembling the torque transmission shaft 124 is thereby complete.

The torque-side shaft 161 and the pinion shaft 162 regulate each other's relative rotation and axial movement.

As is clear from the above description, the torque-side shaft 161 is composed of a hollow shaft, and the pinion shaft 162 is composed of a solid shaft that fits into the hollow shaft. It is preferable that the pinion shaft 162 be a hollow shaft rather than a solid shaft in order to reduce weight.

The cross-sectional shapes of the fitting hole 165 and the fitting ridges 163a, 163a are not limited to polygonal cross sections and may also be circular cross sections. Circular cross sections are easier to manufacture and result in easier management of fitting precision and easier fitting.

The steering torque transmitted from the steering wheel 121 (see FIG. 12) to the pinion shaft 162 via the linking part 168 is also transmitted from the pinion shaft 162 to the torque-side shaft 161 via the pins 167, 167.

Next, the details of the magnetostrictive torque sensor device 141 will be described based on FIGS. 14, 15(a), 15(b), and 16.

In the magnetostrictive torque sensor device 141, the surface of the torque transmission shaft 124 on which torque acts from the exterior is provided with magnetostrictive films 171 and 172 composed of plating layers whose magnetostrictive characteristics vary according to torque, and a detector 173 for electrically detecting the magnetostrictive effects occurring in the magnetostrictive films 171 and 172 is provided around the peripheries of the magnetostrictive films 171 and 172.

More specifically, the torque-side shaft 161 has magnetostrictive films 171 and 172 of mostly constant widths that are disposed at a mostly constant distance di apart from each other in the axial longitudinal direction, and that are formed around the entire periphery at two locations on the external peripheral surface. The directions of magnetostriction in the magnetostrictive films 171 and 172 are opposite from each other. Naturally, the surface of the torque-side shaft 161 has a non-magnetostrictive part 179 between the first magnetostrictive film 171 and the second magnetostrictive film 172, where there are no magnetostrictive films at all. The two magnetostrictive films 171 and 172 may also be one continuous magnetostrictive film.

The magnetostrictive films 171 and 172 are films composed of a material whose magnetic flux density varies greatly during variation in strain. For example, the films may be composed of an Ni—Fe-based alloy formed by vapor plating on the external peripheral surface of the torque-side shaft 161. The alloy film preferably has a thickness of about 5 to 20 µm. The alloy film may, however, have a thickness less or greater than this. The direction of magnetostriction of the second magnetostrictive film 172 differs from the direction of magnetostriction of the first magnetostrictive film 171. The two magnetostrictive films 171 and 172 have different magnetostrictive anisotropies.

In cases in which the Ni—Fe-based alloy film has a Ni content of approximately 20 wt % or approximately 50 wt %, the magnetostrictive effects tend to increase because of the higher magnetostriction constant, and it is preferable to use a material having such a Ni content. For example, a material that has a Ni content of 50 to 60 wt %, with the balance being Fe, is used as the Ni—Fe-based alloy film. The magnetostrictive films 171 and 172 may also be ferromagnetic films, or films of Permalloy (Ni: about 78 wt %, Fe: remainder) or Supermalloy (Ni: 78 wt %, Mo: 5 wt %, Fe: remainder). The symbol Ni refers to nickel, the symbol Fe refers to iron, and the symbol Mo refers to molybdenum.

The detecting coil 173 is composed of cylindrical coil bobbins 174 and 175 through which the torque-side shaft 161 passes, a first multilayered solenoidal coil 176 and a second multilayered solenoidal coil 177 wound around the coil bobbins 174 and 175, and a magnetic shielding back yoke 178 surrounding the peripheries of the first and second multilayered solenoidal coils 176 and 177, as shown in FIG. 14.

The first and second multilayered solenoidal coils 176 and 177 are detection coils. Hereinbelow, the first multilayered solenoidal coil 176 is referred to instead as a first detection coil 176, and the second multilayered solenoidal coil 177 is referred to instead as a second detection coil 177.

Torsion occurring in the torque-side shaft 161 in accordance with steering torque can be magnetically detected by the first and second detection coils 176 and 177.

The following is a description of the method for manufacturing the magnetostrictive torque sensor 141, and particularly of the method for manufacturing the torque transmission shaft 124 and the magnetostrictive films 171 and 172 having the configuration described above.

Hereinbelow, the torque-side shaft 161 is appropriately referred to as the "hollow shaft 161," and the pinion shaft 162 is appropriately referred to as the "solid shaft 162," the "operating shaft 162," or the "rotating shaft 162".

The method for manufacturing the torque transmission shaft 124 and the magnetostrictive films 171 and 172 follows the steps in FIG. 15 and the subsequent FIG. 16. FIGS. 16(*a*) through 16(*e*) show the method for manufacturing the torque transmission shaft and the magnetostrictive films. The bearing 156 (see FIG. 14) is omitted from FIG. 16.

First, two members are prepared that will serve as parts of the torque transmission shaft 124, which are the hollow shaft 161 that has the magnetostrictive films 171 and 172 formed on the external peripheral surface, and the solid shaft 162 fitted inside the hollow shaft 161, as shown in FIG. 15(*a*) (shaft preparation step).

Next, the solid shaft 162 is pressed into the hollow shaft 161, and these two shafts are linked together by the pins 167, 167, as shown in FIGS. 15(*b*) and 15(*c*) (shaft linking step). As a result, the torque transmission shaft 124 shown in FIG. 15(*d*) can be manufactured.

Next, the magnetostrictive films 171 and 172 are heat-treated for a pre-set amount of time, e.g., for 3 seconds or longer, while a pre-set constant torque is applied to at least one of the hollow shaft 161 and the solid shaft 162 (external force application step and heat treatment step).

Specifically, first, a first jig 201 catches on the jig catch 162*b* (or on both the jig catch 162*b* and the flange 162*a*) at one end of the solid shaft 162, as shown in FIG. 16(*a*).

A second jig 202 catches on the jig catch 163*b* (or on both the jig catch 163*b* and the linking part 168) at the other end of the solid shaft 162.

Next, a heating device, e.g., a high-frequency hardening device 203 is set on the first magnetostrictive film 171, as shown in FIG. 16(*b*). The high-frequency hardening device 203 is composed of a heating coil 204 that surrounds the periphery of the first magnetostrictive film 171, and a power source device 205 for supplying high-frequency AC electric power to the heating coil 204.

Next, the second jig 202 is twisted clockwise R1 in the diagram, and the first jig 201 is twisted counterclockwise R2 in the opposite direction of the second jig 202 in the diagram. Thus, a pre-set forward torque is applied to the solid shaft 162. The strength of this torque is preferably about 30 to 100 Nm. The torque may also be greater than this.

Since the hollow shaft 161 is configured so that its rotation relative to the solid shaft 162 is regulated, the preset forward torque can also be applied to the hollow shaft 161 (external force application step). As a result, forward torque is also applied to the first magnetostrictive film 171.

Next, while the first and second jigs 201 and 202 are used to apply torque, the first magnetostrictive film 171 (particularly the surface and surface layer portion of the film) is heated by the high-frequency hardening device 203 over a preset amount of time, as shown in FIG. 16(*b*) (heating step). This heating time is preferably about 3 to 5 seconds. The heating time may also be longer than this. The heating temperature is preferably about 400° C.

After the first magnetostrictive film 171 is cooled to a lower temperature than the temperature to which it was heated, the twisting of the first and second jigs 201 and 202 stops and the torque is canceled, as shown in FIG. 16(*c*) (external force canceling step).

During the heating step, the first magnetostrictive film 171 can be sufficiently cooled merely by the external temperature if the time of heating the first magnetostrictive film 171 by means of high-frequency hardening is set to about 3 to 5 seconds. Since the heating temperature of the first magnetostrictive film 171 is about 400° C., the first magnetostrictive film 171 can be cooled to a temperature equal to or less than 400° C.

Next, the high-frequency hardening device 203 is set on the second magnetostrictive film 172, as shown in FIG. 16(d).

Next, the second jig 202 is twisted counterclockwise R2 in the diagram, and the first jig 201 is twisted clockwise R1 in the diagram in the opposite direction of the second jig 202. These directions are opposite from the previous case. Thus, a preset reverse torque is applied to the solid shaft 162. The strength of this torque is preferably 30 to 100 Nm. The torque may also be greater than this.

Since the hollow shaft 161 is configured so that its rotation relative to the solid shaft 162 is regulated, the preset reverse torque can also be applied to the hollow shaft 161 (external force application step). As a result, reverse torque is also applied to the second magnetostrictive film 172.

Next, while the first and second jigs 201 and 202 are used to apply torque, the second magnetostrictive film 172 (particularly the surface and surface layer portion of the film) is heated by the high-frequency hardening device 203 over a preset amount of time, as shown in FIG. 16(d) (heating step). This heating time is preferably about 3 to 5 seconds. The heating time may also be longer than this. The heating temperature is preferably about 400° C.

Next, after the second magnetostrictive film 172 is cooled to a lower temperature than the temperature to which it was heated, the twisting of the first and second jigs 201 and 202 stops and the torque is canceled, as shown in FIG. 16(e) (external force canceling step).

During the heating step, the second magnetostrictive film 172 can be sufficiently cooled merely by the external temperature if the time of heating the second magnetostrictive film 172 by means of high-frequency hardening is set to about 3 to 5 seconds. Since the heating temperature of the second magnetostrictive film 172 is about 400° C., the second magnetostrictive film 172 can be cooled to a temperature equal to or less than 400° C.

As a result, the magnetostriction directions of the first and second magnetostrictive films 171 and 172 can reliably and easily be oriented in the direction in which torque is applied.

Thus, according to this manufacturing method, first, the solid shaft (operating shaft) 162 is pressed into the hollow shaft 161 that has the magnetostrictive films 171 and 172 formed on the external peripheral surface, and the two shafts are linked together, thereby yielding the torque transmission shaft 124. Strain is created in the magnetostrictive films 171 and 172 as a result of the press-fitting and linking, and this strain remains unchanged therein.

In this manufacturing method, the magnetostrictive films 171 and 172 are heat-treated over a preset amount of time while preset torque is applied to at least one of the solid shaft 162 and hollow shaft 161. After the heat treatment is complete, the magnetostrictive films 171 and 172 are cooled to a lower temperature than the temperature at which they were heated, and the torque applied to at least one of the solid shaft 162 and hollow shaft 161 is canceled.

Thus, the magnetostrictive films 171 and 172 can be heat-treated for a specific amount of time while subjected to torque, causing the magnetostrictive films 171 and 172 to creep. The term "creep" refers to a phenomenon in which the strain in the material increases over time when the material is heated at a constant temperature under a constant load (including torque).

Specifically, the creep resulting from heat-treating the magnetostrictive films 171 and 172 can be used to efficiently reduce or eliminate the strain remaining in the magnetostrictive films 171 and 172. Moreover, it is possible to use the creep to newly generate permanent strain in the magnetostrictive films 171 and 172, by heat-treating the magnetostrictive films 171 and 172 while applying torque. As a result, the magnetostriction directions of the magnetostrictive films 171 and 172 can reliably and easily be oriented in the direction in which torque is applied. In other words, the first magnetostrictive film 171 and the second magnetostrictive film 172 can be provided with magnetostrictive anisotropy.

Next, after the second heat treatment, multiturn coils are disposed at positions corresponding to the magnetostrictive films 171 and 172, and the same detection circuit as the detection circuit shown in FIG. 9 is connected. The torque transmission shaft 124 is installed in the gearbox. A gain adjuster provided to the detection circuit adjusts the gain. The gain setting device described in in relation to the first embodiment and shown in FIG. 10 is used for this gain adjustment in the same manner as in the first embodiment.

In the embodiments of the present invention, the structure for linking the hollow shaft 161 and the solid shaft 162 is not limited to the pins 167, and the shafts may also be linked by press-fitting or by screws.

The configurations, shapes, sizes, and arrangement relationships described in the above examples are merely schematic depictions that allow the present invention to be understood and implemented, and the numerical values and constitutions (materials) of the configurations are merely examples. The present invention is therefore not limited to the described examples, and it is possible to make various modifications that do not deviate from the scope of the technological ideas presented in the claims.

Obviously, various minor changes and modifications of the present invention are possible in light of the above teaching. It is therefore to be understood that within the scope of the appended claims the invention may be practiced otherwise than as specifically described.

What is claimed is:

1. A method for manufacturing a magnetostrictive torque sensor device comprising the steps of:
   providing a rotating shaft with magnetostrictive parts endowed with magnetic anisotropy;
   disposing detection coils around the magnetostrictive parts to detect changes in magnetostrictive characteristics of the magnetostrictive parts;
   providing a detection circuit for bringing out detection signals from signals outputted from the detection coils; and
   adjusting a gain of a gain adjuster included in the detection circuit, wherein the gain of the gain adjuster is adjusted by means of a gain setting signal provided from outside.

2. The method of claim 1, wherein the step of providing the magnetostrictive parts with magnetic anisotropy comprises the steps of:
   heating the rotating shaft while specific twisting torque is applied to the rotating shaft; and
   providing the magnetostrictive parts with magnetic anisotropy by canceling the twisting torque.

3. The method of claim 1, wherein the rotating shaft comprises a steering shaft.

* * * * *